United States Patent
Erdodi et al.

(10) Patent No.: US 11,130,869 B2
(45) Date of Patent: Sep. 28, 2021

(54) AQUEOUS COPOLYMER COATING COMPOSITIONS FOR INDUSTRIAL AND CONSTRUCTION APPLICATIONS

(71) Applicant: Lubrizol Advanced Materials, Inc., Cleveland, OH (US)

(72) Inventors: Gabor Erdodi, Macedonia, OH (US); Naser Pourahmady, Solon, OH (US); Yutao Yang, Northfield, OH (US); Jonathan J. Bird, Wooster, OH (US); Israel J. Skoff, Stow, OH (US); Darlene D. Rota, Avon, OH (US); Lisa A. Blevins, Akron, OH (US); Anthony D. Pajerski, Broadview Heights, OH (US)

(73) Assignee: Lubrizol Advanced Materials, Inc, Cleveland, OH (US)

( * ) Notice: Subject to any disclaimer, the term of this patent is extended or adjusted under 35 U.S.C. 154(b) by 28 days.

(21) Appl. No.: 15/503,325

(22) PCT Filed: Aug. 7, 2015

(86) PCT No.: PCT/US2015/044118
§ 371 (c)(1),
(2) Date: Feb. 10, 2017

(87) PCT Pub. No.: WO2016/025300
PCT Pub. Date: Feb. 18, 2016

(65) Prior Publication Data
US 2017/0233605 A1    Aug. 17, 2017

Related U.S. Application Data

(60) Provisional application No. 62/035,710, filed on Aug. 11, 2014.

(51) Int. Cl.

| | | |
|---|---|---|
| *C09D 5/00* | (2006.01) | |
| *C08G 69/26* | (2006.01) | |
| *C08G 69/48* | (2006.01) | |
| *B32B 15/088* | (2006.01) | |
| *C08J 7/043* | (2020.01) | |
| *C08J 7/046* | (2020.01) | |
| *C08L 75/04* | (2006.01) | |

(52) U.S. Cl.
CPC ............ *C09D 5/002* (2013.01); *B32B 15/088* (2013.01); *C08G 69/265* (2013.01); *C08G 69/48* (2013.01); *C08J 7/043* (2020.01); *C08J 7/046* (2020.01); *C08L 75/04* (2013.01)

(58) Field of Classification Search
CPC ......... C09D 5/002; C08L 75/04; C08G 69/48; C08G 69/265; C08G 73/0633; C08G 18/606; C08G 18/758; C08G 18/0823; C08G 18/12; C08G 18/246; C08G 18/3215; C08G 18/3231; C08G 18/3271; C08G 69/34; C08G 69/44; C08J 7/043; C08J 7/046; C08J 7/0427; B32B 15/088
See application file for complete search history.

(56) References Cited

U.S. PATENT DOCUMENTS

| | | | | |
|---|---|---|---|---|
| 3,799,854 A | * | 3/1974 | Jerabek .............. | C08G 18/0814 428/425.8 |
| 3,935,146 A | * | 1/1976 | Noll ....................... | C08G 18/10 524/589 |
| 4,235,730 A | * | 11/1980 | Schlicht ............ | C08G 18/3823 44/335 |
| 5,258,481 A | * | 11/1993 | Hesselmans ......... | C08G 18/025 528/28 |
| 5,455,309 A | * | 10/1995 | Albini .................... | C08G 18/10 525/420.5 |
| 5,610,224 A | | 3/1997 | DePue et al. | |
| 2007/0048445 A1 | * | 3/2007 | DiMario .............. | B62D 29/043 427/180 |
| 2008/0008895 A1 | * | 1/2008 | Garner ................... | C04B 26/14 428/500 |
| 2008/0090956 A1 | | 4/2008 | Munzmy et al. | |
| 2008/0223519 A1 | * | 9/2008 | Locko .................... | C08G 18/12 156/331.7 |
| 2011/0037013 A1 | * | 2/2011 | Ragunathan ......... | C09D 133/12 252/62 |
| 2011/0059253 A1 | * | 3/2011 | Tennebroek .......... | C08G 18/36 427/385.5 |

(Continued)

FOREIGN PATENT DOCUMENTS

| | | | | |
|---|---|---|---|---|
| JP | 56149417 | A | * | 11/1981 |
| JP | 60038476 | A | * | 2/1985 |

(Continued)

OTHER PUBLICATIONS

Search Report of Corresponding International Application No. PCT/US2015/044118 dated Sep. 18, 2015.
Written Opinion of Corresponding International Application No. PCT/US2015/044224 dated Sep. 18, 2015.
Corresponding PCT Publication No. WO 2016/025300 A1 published Feb. 18, 2016.
Japanese Official Action, Japanese Patent Office, dated Jun. 4, 2019.

* cited by examiner

*Primary Examiner* — John D Freeman
(74) *Attorney, Agent, or Firm* — Vincent Cortese; Teresan Gilbert

(57) ABSTRACT

Copolymer dispersions containing polyamide segments in aqueous media form binders for coatings for various industrial and construction materials. The copolymers have a high percentage of amide linkages. The copolymers are linked into higher molecular weight species by reactions with polyisocyanates (which forms urea linkages if the other reactant is an amine or a urethane linkage if the other reactant is a hydroxyl group).

15 Claims, No Drawings

(56) References Cited

U.S. PATENT DOCUMENTS

2016/0009953 A1* 1/2016 Erdodi ................. C09D 175/12
　　　　　　　　　　　　　　　　　　　　524/514

FOREIGN PATENT DOCUMENTS

| WO | 2002098941 A1 | 12/2002 | | |
|---|---|---|---|---|
| WO | WO-2014126741 A2 * | 8/2014 | ............. | C08G 69/00 |

AQUEOUS COPOLYMER COATING COMPOSITIONS FOR INDUSTRIAL AND CONSTRUCTION APPLICATIONS

CROSS REFERENCE TO RELATED APPLICATION

This application is a national phase entry under 35 U.S.C. 371 of PCT/US2015/044118 filed Aug. 7, 2015, which claims the benefit of U.S. Provisional Application No. 62/035,710 filed Aug. 11, 2014.

FIELD OF INVENTION

The invention relates to water borne polymer dispersions of the polyurea or polyurethane type comprising an polyamide segment linked via a reaction of a hydroxyl or amine group of the polyamide with a polyisocyanate to form a polyurethane or polyurea. The resulting polymers are useful to form a decorative or protective coating on wood, metal, plastic or masonry. The inclusion of the polyamide segments improves the UV resistance relative to polyethers, hydrolytic stability relative to polyesters, and some of the surface properties.

BACKGROUND OF THE INVENTION

GB 779247(A) published Jul. 17, 1957 teaches linear secondary polyamides for stoving compounds (often in combination with polyisocyanates). GB 1452073(A) published Oct. 6, 1976 teaches a blend of (A) a linear polyhydroxy polymer free of ethylene terephthalate units of molecular weight 400-4000 and being liquid at 80° C.; (B) a linear polyester of molecular weight 400 to 3000, melting point of 50-220° C. and 35-95 mol % of molecular chain is ethylene terephthalate; (C) a linear polyamide of molecular weight of 400-4000 and melting point of 100 to 200° C. in which at least 80% of the terminal groups are amino groups, and (D) an organic diisocyanate.

AU 669215(B2) published May 12, 1994 taught a 200-2000 molecular weight polyamide from various anhydrides or diacid halides with diamines, amino alcohol, amino thiol, and mixtures of these amine compounds. The polyamide is 6 to 25 wt. % of the total resins. The polyamide is reacted with excess diisocyanate to create an isocyanate terminated resin of 25,000 to 50,000 molecular weight. The resins are used in solvent based coatings.

EP 595281(A2) to BASF published May 4, 1994 and teaches a water dispersible ionic and nonionic polyamide modified polyurethane for use in automobile clearcoat and basecoat systems. The AU equivalent is AU 4903693.

EP595286(A1) to BASF published May 4, 1994 and interpreted based on AU-B-49162/93 teaches a solvent borne polyamide modified polyurethane resin for use in automotive clearcoat and basecoat.

"Novel Poly(urethane-amide)s from Polyurethane Prepolymer and Reactive Polyamides. Preparation and Properties", Polymer Journal, Vol. 34, No. 6, pp 455-460 (2002) describes a soluble polyamide containing aliphatic hydroxyl group in the backbone that were reacted with a polyurethane prepolymer with isocyanate groups that were endcapped with phenol. The polyamide and prepolymer were mixed together and cast on glass substrates. The cast films were treated with heat to release the phenol, thereby unblocking the isocyanates, which then reacted with the hydroxyl groups of the polyamide.

U.S. Pat. No. 7,276,570 assigned to Acushnet Company discloses compositions for golf equipment, such as golf balls comprising thermoplastic, thermoset, castable, or millable elastomer compositions comprising at least one polymer having a plurality of anionic moieties attached thereto. The compositions can be used as part of golf ball construction.

WO2006/053777 A1 to Novartis Pharma GmbH discloses crosslinkable poly(oxyalkylene) containing polyamide prepolymers that can be used to provide water-soluble prepolymers that can be used as a component in contact lenses.

US 2006/0047083A1 published Mar. 2, 2006 discloses triblock thermoplastic polymers of the ABA type wherein the A blocks represent hard segments such as urethane, urea, urethane-urea, or amide type segments and the B blocks represent soft segments such as aliphatic polyethers, aliphatic polyesters, poly(dimethylsiloxane)s, polyalkanes and their copolymers.

US2008/081870A1 (equivalent to EP 190577(A2)) to Bayer describes a size composition comprising polyurethane-polyurea repeat units with carboxylic amide containing repeat units. The backbone contains 0.75 to 10 wt. % C(O)—NH groups. The composition is used as a sizing for glass fibers used in nylon compositions.

U.S. Pat. No. 5,610,224 (equivalent to EP059581) to BASF discloses an ionic and nonionic polyamide modified polyurethane polymers for use in coating compositions, method for forming, and coating compositions containing these polymers.

US 2008/0223519 A1 (equivalent WO2008/070762 A1) assigned to Arizona Chemical Company discloses polyamide polyols and polyurethanes, methods for making and using and products made therefrom. It discloses reaction products of a polymeric and non-polymeric diamine with dicarboxylic acid and hydroxy substituted carboxylic acid. It also discloses reactions of the polyamide with diisocyanates.

"Polyurethane-Amide Hybrid Dispersions", Journal of Polymer Engineering, Vol. 29, Nos. 1-3, pp 63-78, 2009 describes aqueous polyurethanes with amide groups in the hard segments that were made by chain extending the prepolymer with various dicarboxylic acids. The particle size, mechanical and dynamic mechanical properties of cast films along with water swell and adhesion were studied.

WO2011/052707A1 titled Aqueous Polyamide Resin Dispersion, Method for Producing the Same, and Laminate discloses making a solvent dispersible polyamide for laminates.

US 2011/0124799 A1 to E. I. Du Pont de Nemours and Company describes inkjet inks for textiles containing crosslinked polyurethanes and further containing additional reactive components.

EP 449419 A1 describes reacting primary aminoalcohols with acid terminated polyamideethers to create hydroxyl terminated polymers.

SUMMARY OF THE INVENTION

This invention relates to hydrolysis resistant polyurea/urethane polymers useful to make a dispersion in aqueous media comprising urea or urethane linkages and/or one or more polyamide segments. The term polyurea/urethane is meant to cover urea linkages and/or urethane linkages in a polymer. The composition may contain small amounts of other polymers and materials either as physical blends or where the other polymers (e.g. polyesters or polyethers) or materials are co-reacted into the polyurea/urethane polymer. The term polyamide oligomer will refer to an oligomer with two or more amide linkages, or sometimes the amount of amide linkages will be specified. A subset of polyamide oligomers will be telechelic polyamides. Telechelic polyamides will be polyamide oligomers with high percentages, or specified percentages, of two or more functional groups of a single chemical type; e.g. two terminal amine groups, meaning either primary, secondary, or mixtures; two terminal carboxyl groups; two terminal hydroxyl groups, again meaning primary, secondary, or mixtures; and two terminal isocyanate groups, meaning aliphatic, aromatic polyisocyanates, or mixtures. Reactive amine terminated telechelic polyamides will be telechelic polyamide oligomers where the terminal groups are both amine types, either primary or secondary or mixtures thereof, i.e., excluding tertiary amine groups.

In one embodiment, the polyurea/urethane polymer is colloidally dispersed in water and is the reaction product of a polyisocyanate, defined as a molecule with two or more isocyanate groups, and an amine or hydroxyl terminated polyamide oligomer via a urea or urethane linkage. In preferred embodiments, the colloidal particles are characterized by their size and the polyamide is further characterized by its composition. In another embodiment, a liquid telechelic prepolymer is described a polyurea/urethane polymer or prepolymer comprised of a reaction product of a polyamide with at least two amide linkages and about two terminal Zerewitinoff groups, Zerewitinoff group being defined as active hydrogen containing groups (such as amine or hydroxyl) that are reactive with isocyanates to form chemical bonds, with a polyisocyanate as described above, optionally with other molecules with Zerewitinoff groups. A small amount of compatible solvent or ethylenically unsaturated monomers (such as free radically polymerizable monomers such as acrylic monomers) may be used to reduce the prepolymer viscosity to facilitate dispersion in water (functioning as a plasticizer). A water-soluble diamine may be used in the aqueous media to promote chain-extension if an isocyanate terminated prepolymer is present.

The inventive coating material generally comprises a binder from the polyurea or polyurethane comprising the polyamide, an optional pigment(s) if a colored binder is desired, optional filler, and optional dye, wherein at least 20 wt. % (more desirably at least 25, 30, 40, 50, 60, 70, 80 or 90 wt. %) of said binder is characterized as amide repeat units being derived from amide condensation of monomers selected from dicarboxylic acid, lactam, aminocarboxylic acid, and diamine monomers. Generally, at least 5, 10 or 15 wt. % (more desirably at least 20, 25, or 30 wt. %) of the binder comprises repeat units derived from polyisocyanates reacted with hydroxyl or amine groups to generate urea or urethane linkages at the two or more ends of each repeat unit derived from polyisocyanate. The repeat units derived from polyisocyanates will consist of the N—C—(=O) terminal groups and the residual portion of the polyisocyanate that was between the N—C—(=O) groups. It will not include the 0 of the hydroxyl group or the N of the amine group. In a preferred embodiment, at least 25 or 50 mole % of said amide linkages will be characterized as tertiary amide linkages (more desirably at least 60, 70, or 80 mole %) where the nitrogen bonded to a carbonyl group of the amide linkage also has two additional hydrocarbon groups chemically bonded to said nitrogen of said tertiary amide linkage. In the broadest scope of the invention, the polyamide can comprise amide repeat units from primary amine groups.

In one embodiment, the polyamide dispersion is used as a coating on substrate (optionally rigid) such as wood, metal, plastic or masonry. Some substrates need coating properties including but not limited to adhesion, chemical resistance, UV light resistance, corrosion resistance, alkali resistance, hardness, and abrasion resistance. While polyamides historically haven't seen use in protective coatings due to their high film formation temperatures, the current technology provides the ability to bring the desired physical properties into coating technology for substrates and achieve high integrity films from aqueous based dispersions. The inherent polarity of amide linkages in combination with olefinic properties of the amide repeat units provides for a wide variety of polarities, surface tensions (and surface energy), low friction surfaces, wear resistance, UV light resistance, alkali resistance, corrosion resistance, water and solvent resistance, and good adhesion to a variety of substrates. The fact that these substrates are rigid opens the opportunity to crosslink the binder of the dispersions to give further benefits in term of chemical resistance, hardness, abrasion resistance, and corrosion resistance.

DETAILED DESCRIPTION OF THE INVENTION

Definitions: We will use the parentheses to designate 1) that the something is optionally present such that monomer(s) means monomer or monomers or (meth)acrylate means methacrylate or acrylate, 2) to qualify or further define a previously mentioned term, or 3) to list narrower embodiments.

A first portion of this invention is the substitution of polyamide segments for polyester, polyether, or polycarbonate segments in a polymer made from isocyanate derived hard segments and the already mentioned macromonomers. The replacement by polyamide segments for polyester, polyether, or polycarbonate segments can be partial or complete. Optimum environmental resistance would result from complete replacement of polyester and polyether segments, due to their potential for easier chain scission, but in some application some of the polyester and or polyether segments could be retained for their ability to soften the elastomeric portion or modify the compatibility of the resulting polymer with other polymer surfaces. When polymer from polyesters or polyether are degraded by hydrolysis or UV activated chain scission, the molecular weight of the polymer is decreased such that the polymer (or segment) exhibits decreased tensile strength, elongation to break, resistance to solvents, etc., relative to the same polymer before chain scission. The effect of UV exposure on block copolymers of nylon 6-polyethylene glycol block copolymers is reported in Gauvin, Pascal; Lemaire, Jacques in Makromolekulare Chemie (1987), 188(5), 971-986. In the case of coatings, after chain scission the low molecular weight fragments of the polymer are removed by solvents, mild abrasion, and plastic flow leaving the substrate exposed without a coating. In the case of pigmented coatings and inks, chain scission or fracture results in loss of binder and the pigment (without the binder present) is removed by any solvent or mild rubbing or pressure.

A second embodiment of this invention is the substitution of polyurea linkages for some or all of the urethane linkages. Urea linkages are derived from reacting an isocyanate group with a primary or secondary amine. Urethane linkages are derived from reacting an isocyanate group with an oxygen of a hydroxyl group. Urea linkages form hard segments with higher melting temperatures than urethane linkages. Thus, increasing the percentage of urea linkages increases the practical use temperature of a polymer, the temperature where the hard segment, if associated together, are sufficiently rigid such that the polymer does not permanently deform by plastic flow in response to stress.

A second benefit of the first portion of this invention (substituting low Tg polyamide segments for polyether or polyester segments) is that the polyamide segments tend to promote better wetting and adhesion to a variety of polar substrates, such as glass, nylon, and metals than polyester or polyether based polyurethanes. The hydrophobic/hydrophilic nature of the polyamide can be adjusted by using different ratios hydrocarbyl portion to amide linkages in the polyamide. Diacids, diamines, aminocarboxylic acids, and lactams with large carbon to nitrogen ratios tend to be hydrophobic. When the carbon to nitrogen ratio in the polyamide becomes smaller, the polyamide is more hydrophilic.

Thus polymers made from polyamide segments can have good solvent resistance. Solvents can deform and stress a polymer by swelling, thereby causing premature failure of the polymer or parts from the polymer. Solvents can cause a coating to swell and delaminate from a substrate at the interface between the two. Adding polyamide to a polymer can increase adhesion to substrates that have similar or compatible surfaces to polyamides.

One objective of the current patent application is to use high percentages of amide linkages in a polymer segments incorporated via reaction with polyisocyanates into a copolymer with thermoplastic, optionally elastomeric, properties to provide resistance to chain scission from hydrolysis and UV activated chain scission. Thus, many embodiments will describe soft segments with high percentages of total linkages between repeat units in the soft segment being amide linkages. Some embodiments may allow for some linkages between repeat units to be other than amide linkages. In some embodiments the linkages between the polyamide oligomer and the isocyanate groups of the polyisocyanate will have significant portions of urea linkages. Urea linkages tend to have a higher melting temperature than urethane linkages and therefor provide higher use temperatures. Some embodiments may allow for urethane linkages between polyamide oligomers and the isocyanate groups of the polyisocyanate component, when preventing chain scission isn't a top priority.

An important modification from conventional polyamides to get low Tg polyamide soft segments is the use of monomers with secondary amine terminal groups in forming the polyamide. The amide linkage formed from a secondary amine and a carboxylic acid type group is called a tertiary amide linkage. Primary amines react with carboxylic acid type groups to form secondary amides. The nitrogen atom of a secondary amide has an attached hydrogen atom that often hydrogen bonds with a carbonyl group of a nearby amide. The intra-molecular H-bonds induce crystallinity with high melting point and act as crosslinks reducing chain mobility. With tertiary amide groups the hydrogen on the nitrogen of the amide linkage is eliminated along with hydrogen bonding. A tertiary amide linkage that has one additional alkyl group attached to it as compared to a secondary amide group, which has hydrogen attached to it, has reduced polar interactions with nearby amide groups when the polymer exists in a bulk polymer sample. Reduced polar interactions mean that glassy or crystalline phases that include the amide linkage melt at lower temperatures than similar amide groups that are secondary amide groups. One way to source secondary amine reactant, a precursor to tertiary amide linkages, is to substitute the nitrogen atom(s) of the amine containing monomer with an alkyl group. Another way to source a secondary amine reactant is to use a heterocyclic molecule where the nitrogen of the amine is part of the ring structure. Piperazine is a common cyclic diamine where both nitrogens are of the secondary type and part of the heterocyclic ring.

Another modification to reduce the Tg of the polyamide soft segments is to use at least one additional monomer beyond the minimum number of monomers to form the polyamide. Thus for a polyamide formed from a lactam polymerization such as from N-methyl-dodecyl lactam one would include an additional lactam, aminocarboxylic acid, diamine, or dicarboxylic acid in the monomers for the polymerization to change the spacing (among repeat units) between the amide linkages formed by the monomer so that the spacing between the amide linkages in the polyamide is irregular along the backbone, not the same physical dimension. For a polymerization of aminocarboxylic acid, one would include additional lactam, aminocarboxylic acid, diamine, or dicarboxylic acid (with different physical length between the primary reactive groups of the monomer) in the monomer blend for the polymerization to change the spacing among repeat units between the amide linkages. Switching end groups on the monomers can also disrupt regularity in the spacing of the polar amide linkages and lower the effective Tg of the copolymer. Thus co-polymerizing a $C_6$ amino carboxylic acid or lactam with a $C_6$ diacid and $C_6$ diamine can disrupt regularity of the amide linkages as the diacid and diamine units would switch the orientation of the amide linkage from head to tail orientation to tail to head orientation, slightly disrupting uniformity of spacing of the amide linkages along the polyamide backbone. Typically, when following this procedure one would try to add a disrupting monomer that increased or decreased the number of atoms between the amide forming end groups of the monomer(s) used as the primary monomer in the polyamide. One could also use a second disrupting monomer that had a cyclic structure (such as piperazine, a cyclic diamine monomer with where two methylene atoms form the top half of the ring and two methylene atoms form the bottom half of the ring) to disrupt the regularity of polyamide formed from a diacid reacted with a diamine monomer with two methylene atoms between the nitrogen atoms of the diamine.

Another way to express the use of a copolymerization method to reduce the Tg and consequently the hardness of the polyamide is that the polyamide is characterized as being within a, b or c a) when said amide linkages are derived from polymerizing one or more monomers and more than 90 mole % of said monomers are derived from polymerizing monomers selected from lactam and aminocarboxylic acid monomer then said polyamide is defined as a copolymer of at least two different monomers, meaning said monomers are characterized as being at least two different monomers because they have hydrocarbyl portion of different spacing length between the amine and carboxylic acid groups, wherein each of said at least two different monomers is present at molar concentrations of at least 10%, more desirably at least 20 or 30%, of the total lactam and/or aminocarboxylic acid monomers in said polyamide, or b) when said amide linkages are derived from polymerizing two or more monomers and more than 90 mole % of said monomers were derived from polymerizing dicarboxylic acid and diamine monomers then said polyamide is defined as a terpolymer of at least three different monomers (meaning said amide linkages are formed from at least three different monomers selected from the group of dicarboxylic acid and diamine monomers wherein said at least three different monomers are characterized as different from each other by a hydrocarbyl group of different spacing length between the carboxylic acid groups of the dicarboxylic acid, or different spacing length between the amine groups of the diamine, wherein each of said at least three different monomers is present at concentrations of at least 10 mole %, more desirably at least 20 or 30 mole %, of the total monomers in said polyamide), or c) with the proviso that if said amide linkages are derived from polymerizing a combination of dicarboxylic acid, diamine and either lactam and/or aminocarboxylic acid monomers such that the total dicarboxylic acid monomer(s) and the diamine monomer(s) are present at 10 mole % or more, more desirably 20 or 30 mole % or more, and the total lactam and aminocarboxylic acid monomers are present in the monomer blend at 10 mole % or more, more desirably 20 or 30 mole % or more, then there are no restrictions requiring additional different monomers.

Coatings for wood, metal, plastics, and masonry included solvent based coatings until environmental and worker safety issues pushed for water based coatings (low levels of volatile organic compounds (VOC)). Due to the performance demands on coatings for wood, metal, plastics, and masonry; some minimal level of solvents (VOC) were retained in many urethane and epoxy coatings (premium binders) to facilitate coalescence and adhesion of these polymers to themselves and substrates. Acrylate polymers are used in some of the applications and historically it was easier to remove coalescents to lower levels in acrylate binders. However, urethane and epoxy coatings (which used larger amounts of coalescents) captured most of the high performance application areas. Current government environmental regulations is pushing for even lower levels of coalescing solvents, creating a need for new technology to replace current products that utilize higher levels of coalescing solvents.

In one embodiment, the binder is primarily polyamide repeating units. In another embodiment, the polyamide repeat units comprise at least 20, 30, 40, 50, 60, 70, 80, or 90 wt. % of the binder (or repeat units) of the pretreatment, coating or image. The remainder of the binder can be residues of polyisocyanates, polyether segments, polyester segments, polycarbonate segments, colloidal stabilizing species (such as acidic species for anionic stabilization, amine species for cationic stabilization, or polyalkylene oxide species for nonionic stabilization) or mixtures thereof. For the avoidance of doubt polyamide repeat units will typically comprise a hydrocarbon segment with one or two or more terminal groups with (heteroatoms that comprise oxygen or nitrogen) that form amide linkages. This can be considered as one or more terminal amide linkages per repeat unit if the carbonyl and the nitrogen are considered as being together at one end of the repeat unit or as two or more terminal groups selected from carbonyl or nitrogen at two or more ends (normally just two ends unless a branching repeat unit is developed) of each repeat unit. The hydrocarbon segment can optionally include up to 10 mole % heteroatoms of oxygen or nitrogen based on the moles of carbon and hydrogen atoms in the olefin. Repeat units of polyamides will be derived from condensation polymerization of carboxyl groups with amine groups.

Wood coatings generally need to have high hardness, chemical resistance and abrasion resistance. The hardness is necessary as it is desirable to maintain the smooth surface and any shape formed into the wood. Chemical resistance is desired as many functional wood objects come in contact with chemicals (water, cleaners, make-up, food products, etc.) and manufacturers of wood products like to extend the lifetime of their products with chemical resistant coatings. Abrasion resistance is desirable for similar product lifetime reasons where scratches, dents, nicks, etc. make the coated wood product appear less desirable. Wood substrates will be defined as substrates containing cellulose derived from woody plants. Desirably, wood substrates will comprise at least 50, 60 or 70 wt. % of cellulose and lignin combined based on the weight of the substrate. The other up to 50 wt. % can be a variety of materials including plastics, e.g. for exterior decking materials. Wood substrates will include engineered substrates such as composite wood (strand board, plywood, chipboard, etc.) which is a blend of wood, adhesives and preservatives. Interior wood substrates will generally be coated for enhanced appearance, wear resistance, and chemical resistance. Exterior wood substrates will generally be coated for enhanced appearance, wear resistance, weathering resistance and protection from water and moisture. Exterior coatings will need more UV light protection than interior coatings.

Plastics will include a variety of thermoplastic and thermoset plastics. Thermoplastics include nylon (a polyamide) polyesters, polyethylene, polypropylene, EPDM, thermoplastic polyolefins, some melt processed polyurethanes, polyvinyl chloride, chlorinated polyvinyl chloride, etc. Thermoset plastics will include epoxy articles, thermoset polyesters (sheet molding compound, bulk molding compound, fiber reinforced polyesters such as circuit boards, boat parts, etc., thermoset polyurethanes, etc. Plastics are generally hard to adhere to as they have low surface tension (difficult to wet) and low porosity (less interfacial bond surface). The polyamide binders of this disclosure can match the polarity of plastic substrates to promote adhesion and can form chemical resistant bonds to the plastic substrates. Desirably plastic substrates and composites comprising plastic will comprise at least 50, 60, or 70 wt. % of the plastic based on the weight of the substrate and the remainder can be pigments, fillers, etc. Plastics will generally be coated for decorative or color matching purposes.

Metal substrates will be any of the common metals which benefit from coatings to enhance their appearance or performance. Such metals include aluminium (including alloys), steel (in a variety of grades including stainless), iron, tin, copper, nickel (including alloys), brass, etc. the metal substrates vary a little from the wood and plastics as they can be deformed from a sheet into their intended shape after being coated (several processes exist for forming roofing, gutters, siding, etc. from roll coated metal substrates). Metal substrates can include small amounts of other materials but desirably will comprise at least 50, 70, 80, or 90 wt. % of the specified metal or alloy. The coatings of the current disclosure, because of their good adhesion to metal substrates and good barrier properties will help prevent corrosion to metal substrates from moisture and chemicals that cannot easily penetrate the coating. This is illustrated by things like the salt spray test where corrosive materials are applied to the coated metal object and some determination of corrosion is made after a specified time. The resistance of coatings in the examples to various solvents and household chemicals confirms why these coatings function as barriers to corrosive and/or discoloring fluids.

Masonry will include all of the inorganic based masonry and concrete objects such as mortar, cement blocks, poured cement structures, bricks, stones, rocks, stucco, ceramics such as tiles for floors and walls, etc. Masonry differs from wood and plastics in that it is mostly inorganic, non-flammable, and derived with minimal processing from inorganic sources. Sometimes a masonry object will include minor amounts of metal or wood to reinforce the masonry or enhance its performance. Desirably all masonry substrates will comprise at least 50, 60, 70 or 80 wt. % of inorganic masonry based objects based on the weight of the substrate. Masonry substrates will generally be coated for chemical protection (including water protection), decorative purposes, and wear resistance (e.g. garage floor), Preferred substrates for this application are rigid substrates that are characterized by the inability of a 2.54×15.24 cm specimen of substrate of the normal use thickness (e.g. often 0.04 or 0.05 mm to about 1 mm) to be easily bent and conform in shape with nominal weight when placed perpendicular to a mandrel or rod having a diameter of 2.54 cm. Flexible substrates might form a half circle of about 180 degrees over the top of the mandrel that will have the same approximate internal diameter for the half circle as the external diameter of the mandrel when a weight of a 100 gram weight is hung from the distal ends of the specimen. If the substrate is more rigid than this test it will not easily bend or bend less than 180° over the 2.54 cm diameter of the mandrel and will not conform to the circular shape of the mandrel. A flexible substrate will normally conform to the circular shape of the mandrel and hang horizontally or maybe slightly angled inward from the weight of the 100 gram weight.

The coating of the current application will generally be a continuous coating if chemical protection of the substrate is desired. If the coating is applied only for decorative purposes, it may be only applied in the areas where decoration is desired. If an ink type coating is desired, it may be applied in the form of an image or text. The coating will comprise at least one layer of the polyamide binder (usually with at least urea or urethane linkages) and often with poly(alkylene oxide) or condensation type polyester type segments. Condensation type polyesters will refer to polyesters from condensing diacids with diols and/or hydroxy functional carboxylic acids. Condensation polyesters will also refer to polylactones (because they are so similar in function and structure to condensation polyesters from hydroxy functional carboxylic acids). The coating may be referred to as a film. Each layer of the coating may be from about $20 \times 10^{-6}$ m to about $200 \times 10^{-6}$ m, more desirably from about $20 \times 10^{-6}$ m to about $100 \times 10^{-6}$ m thick. The coating with the polyamide binder can be a primer layer, or it can be applied over a more conventional primer, such as an epoxy primer for metal surfaces.

The coatings of the current application may comprise particulate or fibrous fillers, pigments, dyes, other polymers, surfactants and/or dispersants, coalescents, surface tension modifiers, plasticizers, biocides, and other conventional additives to coating compositions. The coatings of the current application may include internal or external crosslinkers. Internal crosslinkers are generally defined as reactants that can be added to the coating composition that have a long shelf life relative to the time the composition may sit on the shelf before being applied as a coating. External crosslinkers are generally considered as crosslinking additives that can only be added a few minutes or hours before crosslinking will occur. Internal crosslinkers can include hydrazine and hydrazide crosslinkers for polymers with ketone functional groups, water dispersible isocyanates that have a shelf life in excess of 30 days, methylol type crosslinking functionality, polyamine crosslinking for carboxyl containing polymers, etc. External crosslinkers are generally aziridines and highly reactive polyisocyanates (including water dispersible isocyanates) that generally have a short reaction time after addition to a coating composition.

The coatings of the current application may be primer, pigmented coatings, topcoat coatings, clear topcoats, varnish, spar varnish, floor coatings, deck coatings, garage floor coatings, pool coatings, patio coatings, sidewalk coatings, driveway coatings, exterior trim coatings, exterior siding coatings, roof coatings, paneling coatings, barn or shed coatings, outbuilding coatings, etc. The coatings on metal and plastics can include transportation vehicles, construction equipment, industrial equipment, sports equipment, fencing, etc. On masonry substrates the coating exhibits good alkali resistance (many masonry substrates exude alkaline solutions when exposed to water) and efflorescence resistance. Masonry coatings prevent water from penetrating the masonry, which water at sub-freezing temperatures can expand and cause spalling of masonry or enlarge cracks therein. Hot tire pick-up is a problem for garage floors and driveways. It is a tendency to concrete coatings delaminate from the concrete and adhere vehicle tires that have been parked on the coated concrete. This coatings of this disclosure have enhanced resistance to hot tire pick-up relative to acrylate and urethane coatings.

The coatings on various substrates can have a variety of thickness, partially depending on the function of the coating on the substrate. For example, many wood primers are partially embedded into the wood and this can happen with other porous substrates. Generally the coatings will be from about 0.001 to about 0.008 inch in thickness, and more preferably from about 0.001 to 0.004 inch. In metric units the thickness is generally from about $20 \times 10^{-6}$ to $200 \times 10^{-6}$ m, and more desirably from about $30 \times 10^{-6}$ to about $100 \times 10^{-6}$ m.

We use the term low Tg, glass transition temperature, even though we realize most of the polyamide segments are initially low molecular weight and it would not be easily possible to measure the Tg of the low molecular weight oligomers, e.g. the measured value would be dramatically affected by molecular weight. High Tg polymers, e.g. having Tg values above 70, 80, or 90° C. as measured by differential scanning calorimetry (DSC), would tend to form solids or gels even at low molecular weights. Thus the polyamide oligomers, telechelic polyamides, and even the prepolymers from telechelic polyamides or polyamide oligomers are often described in this specification by their viscosity at specific temperatures. Low Tg polyamide oligomers will be defined as those compositions that would have Tg, if above 20,000 g/mole molecular weight, of below 50, 25, or 0° C.

The term polyamide oligomer will refer to an oligomer with two or more amide linkages, or sometimes the amount of amide linkages will be specified. A subset of polyamide oligomers will be telechelic polyamides. Telechelic polyamides will be polyamide oligomers with high percentages, or specified percentages, of two functional groups of a single chemical type, e.g. two terminal amine groups (meaning either primary, secondary, or mixtures), two terminal carboxyl groups, two terminal hydroxyl groups (again meaning primary, secondary, or mixtures), or two terminal isocyanate groups (meaning aliphatic, aromatic, or mixtures). Ranges for the percent difunctional that are preferred to meet the definition of telechelic are at least 70 or 80, more desirably at least 90 or 95 mole % of the oligomers being difunctional as opposed to higher or lower functionality. Reactive amine terminated telechelic polyamides will be telechelic polyamide oligomers where the terminal groups are both amine types, either primary or secondary and mixtures thereof, i.e., excluding tertiary amine groups.

Many of the oligomers, telechelics, and polymers of this specification are made by condensation reactions of reactive groups on desired monomer(s). The condensation reaction of reactive groups will be defined as creating chemical linkages between the monomers. The portion of the monomer that is incorporated into the oligomer or polymer will be defined as the repeat unit from the particular monomer. Some monomers, such as aminocarboxylic acid, or one end of diacid reacting with one end of a diamine, lose one molecule of water as the monomer goes from a monomer to a repeat unit of a polymer. Other monomers, such as lactams, isocyanates, amines reacted with isocyanates, hydroxyl groups reacted with isocyanates, etc. do not release a portion of the molecule to the environment but rather retain all of the monomer in the resulting polymer.

We will define polyamide oligomer as a species below 20,000 g/mole molecular weight, e.g. often below 10,000; 5,000; 2,500; or 2,000 g/mole, that has two or more amide linkages per oligomer. Later, we will define preferred percentages of amide linkages or monomers that provide on average one amide linkage per repeat unit in various oligomeric species. A subset of polyamide oligomer will be telechelic oligomer. The telechelic polyamide has molecular weight preferences identical to the polyamide oligomer above. The term telechelic has been earlier defined. Multiple polyamide oligomers or telechelic polyamides can be linked with condensation reactions to form polymers, generally above 100,000 g/mole.

Generally, amide linkages are formed from the reaction of a carboxylic acid group with an amine group or the ring opening polymerization of a lactam, e.g. where an amide linkage in a ring structure is converted to an amide linkage in a polymer. In a preferred embodiment, a large portion of the amine groups of the monomers are secondary amine groups or the nitrogen of the lactam is a tertiary amide group. Secondary amine groups form tertiary amide groups when the amine group reacts with carboxylic acid to form an amide. For the purposes of this disclosure the carbonyl group of an amide, e.g. in a lactam, will be considered as derived from a carboxylic acid group because the amide linkage of a lactam is formed from the reaction of carboxylic group of an aminocarboxylic acid with the amine group of the same aminocarboxylic acid. The formation of amides from the reaction of carboxylic acid groups and amine groups can be catalyzed by boric acid, boric acid esters, boranes, phosphorous acid, phosphates, phosphate esters, amines, acids, bases, silicates, and silsesquioxanes. Additional catalysts, conditions, etc. are available in textbooks such as "Comprehensive Organic Transformations" by Larock.

The polyamide oligomers and telechelic polyamides of this disclosure can contain small amounts of ester linkages, ether linkages, urethane linkages, urea linkages, etc. if the additional monomers used to form these linkages are useful to the intended use of the polymers. This allows other monomers and oligomers to be included in the polyamide to provide specific properties, which might be necessary and not achievable with a 100% polyamide segment oligomer. Sometimes added polyether, polyester, or polycarbonate provides softer, e.g. lower Tg, segments. Sometimes it is desirable to convert the carboxylic end groups or primary or secondary amine end groups of a polyamide to other functional end groups capable of condensation polymerizations. Sometimes an initiator for oligomer chain polymerization of a lactam is used that doesn't generate an amide linkage. Sometimes a polyether might be used as a segment or portion of a polyamide to reduce the Tg, or provide a soft segment, of the resulting polyamide oligomer. Sometimes a polyamide segment, e.g. difunctional with carboxylic acid or amine terminal groups, can be functionalized with two polyether end segments, e.g. from Jeffamine™ D230, to further lower the Tg of, or provide a soft segment in, the polyamide oligomer and create a telechelic polyamide with amine or hydroxyl end groups. Sometimes a carboxylic acid terminated telechelic polyamide segment is functionalized by reacting with an aminoalcohol, such as N-methylaminoethanol or $HN(R^\alpha)(R^\beta)$ where $R^\alpha$ is a $C_1$ to $C_4$ alkyl group and $R^\beta$ comprises an alcohol group and a $C_2$ to $C_{12}$ alkylene group, alternatively $R^\alpha$ and $R^\beta$ can be interconnected to form a $C_3$ to $C_{16}$ alkylene group including a cyclic structure and pendant hydroxyl group (such as in 2-hydroxymethyl piperidine), either of which can create a telechelic polyamide with terminal hydroxyl groups. The reaction of the secondary amine (as opposed to the hydroxyl group) with the carboxylic acid can be favored by using a 100% molar excess of the amino alcohol and conducting the reaction at 160° C.+/−10 or 20° C. The excess amino alcohol can be removed by distillation after reaction. In one embodiment, a polyamide with a high percentage of tertiary amide linkages, such as at least 80% of said amide linkages being characterized as tertiary amide linkages, is used to make a telechelic prepolymer, characterized as the reaction product of a hydroxyl terminated polyamide with a polyisocyanate and optionally other molecules, where said telechelic polyamide is comprised of one or more repeat units from a lactone of 2 or 4 to 10 carbon atoms and/or a hydroxyl carboxylic acid of 3 to 30 carbon atoms. In one embodiment, said lactone and/or hydroxyl carboxylic acid are added after polymerization of an amine terminated polyamide and are reacted with said amine terminated polyamide to convert it to a hydroxyl terminated polyamide by being the terminal repeat unit(s) on one or both ends of said telechelic polyamide.

As earlier indicated many amide forming monomers create on average one amide linkage per repeat unit. These include diacids and diamines when reacted with each other, aminocarboxylic acids, and lactams. When we discuss these monomers or repeat units from these monomers we generally mean these monomers, their repeat units and their reactive equivalents (meaning monomers that generate the same repeat unit as the named monomer). These reactive equivalents might include anhydride of diacids, esters of diacids, etc. These monomers, when reacted with other monomers in the same group, also create amide linkages at both ends of the repeat units formed. Thus we will use both mole percentages of amide linkages and weight percentages of amide forming monomers. Amide forming monomers will be used to refer to monomers that form on average one amide linkage per repeat unit in normal amide forming condensation linking reactions.

In one embodiment, desirably at least 10 mole %, more desirable at least 25, 30, 45, 50, 55, more desirably at least 60, 70, 75, 76, 80, 90, or 95 mole % of the number of the heteroatom containing linkages connecting hydrocarbon type linkages in the polyamide oligomer or telechelic polyamide are characterized as being amide linkages. Heteroatom linkages are linkages such as amide, ester, urethane, urea, ether linkages, where a heteroatom connects two portions of an oligomer or polymer that are generally characterized as hydrocarbons (or having carbon to carbon bond, such as hydrocarbon linkages). As the amount of amide linkages in the polyamide increases the amount of repeat units from amide forming monomers in the polyamide increases. In one embodiment, at least 50 mole % of the polyamide repeat units are aliphatic amide repeat units rather than aromatic repeat units.

In one embodiment, desirably at least 25 wt. %, more desirable at least 30, 40, 50, more desirably at least 60, 70, 80, 90, or 95 wt. % of the polyamide oligomer or telechelic polyamide is repeat units from amide forming monomers, also identified as repeat units from monomers that form amide linkages at both ends of the repeat unit. Such monomers include lactams, aminocarboxylic acids, dicarboxylic acid and diamines. In one embodiment, desirably at least 25 wt. %, more desirable at least 30, 40, or 50, more desirably at least 60, 70, 80, 90, or 95 wt. % of the polyamide oligomer or telechelic polyamide is tertiary amide forming monomers, also identified as repeat units from monomers that form tertiary amide linkages at the amine ends of the repeat unit. Such monomers include lactams with tertiary amide groups, aminocarboxylic acids with secondary amine groups, dicarboxylic acid and diamines where both amine terminal groups are secondary amines.

In one embodiment, desirably at least 50, 75, 76, 80, 90, or 95 mole percent of the number of the heteroatom containing linkages connecting hydrocarbon type linkages in the polyamide oligomer or telechelic polyamide are characterized as being tertiary amide linkages. In one embodiment, desirably at least 25, 50, 75, 76, 80, 90, or 95 mole percent of the linkages in the polyamide oligomer or telechelic polyamine are tertiary amide linkages. As earlier explained, tertiary amide linkages result from ring opening polymerization of lactams with tertiary amides or reactions of secondary amines with carboxylic acid groups.

Calculation of Tertiary Amide Linkage %:

The % of tertiary amide linkages of the total number of amide linkages was calculated with the following equation:

$$\text{Tertiary amide linkage \%} = \frac{\sum_{i=1}^{n}(w_{tertN,i} \times n_i)}{\sum_{i=1}^{n}(w_{totalN,i} \times n_i))} \times 100$$

where n is the number of monomers,
the index i refers to a certain monomer,
$W_{tertN}$ is the average number nitrogen atoms in a monomer that form or are part of tertiary amide linkages in the polymerizations, (note: end-group forming amines do not form amide groups during the polymerizations and their amounts are excluded from $w_{tertN}$),
$W_{totalN}$ is the average number nitrogen atoms in a monomer that form or are part of tertiary amide linkages in the polymerizations (note: the end-group forming amines do not form amide groups during the polymerizations and their amounts are excluded from $W_{totalN}$), and $n_i$ is the number of moles of the monomer with the index i.

Calculation of Amide Linkage %:

The % of amide linkages of the total number of all heteroatom containing linkages (connecting hydrocarbon linkages) was calculated by the following equation:

$$\text{Amide linkage \%} = \frac{\sum_{i=1}^{n}(w_{totalN,i} \times n_i)}{\sum_{i=1}^{n}(w_{totalS,i} \times n_i)} \times 100$$

where $w_{totalS}$ is the sum of the average number of heteroatom containing linkages (connecting hydrocarbon linkages) in a monomer and the number of heteroatom containing linkages (connecting hydrocarbon linkages) forming from that monomer polymerizations. "Hydrocarbon linkages" are just the hydrocarbon portion of each repeat unit formed from continuous carbon to carbon bonds (i.e., without heteroatoms such as nitrogen or oxygen) in a repeat unit. This hydrocarbon portion would be the ethylene or propylene portion of ethylene oxide or propylene oxide; the undecyl group of dodecyllactam, the ethylene group of ethylenediamine, and the $(CH_2)_4$ (or butylene) group of adipic acid.

Preferred amide or tertiary amide forming monomers include dicarboxylic acids, diamines, aminocarboxylic acids and lactams. Preferred dicarboxylic acids are where the alkylene portion of the dicarboxylic acid is a cyclic, linear, or branched (optionally including aromatic groups) alkylene of 2 to 36 carbon atoms, optionally including up to 1 heteroatom per 3 or 10 carbon atoms, more preferably from 4 to 36 carbon atoms (the diacid would include 2 more carbon atoms than the alkylene portion). These include dimer fatty acids, hydrogenated dimer acid, sebacic acid, etc. Generally, we prefer diacids with larger alkylene groups as this generally provides polyamide repeat units with lower Tg value.

Preferred diamines include those with up to 60 carbon atoms, optionally including 1 heteroatom (besides the two nitrogen atoms) for each 3 or 10 carbon atoms of the diamine and optionally including a variety of cyclic, aromatic or heterocyclic groups providing that one or both of the amine groups are secondary amines, a preferred formula is

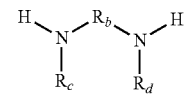

wherein $R_b$ is a direct bond or a linear or branched (optionally being or including cyclic, heterocyclic, or aromatic portion(s)) alkylene group (optionally containing up to 1 or 3 heteroatoms per 10 carbon atoms of the diamine) of 2 to 36 carbon atoms and more preferably 2 or 4 to 12 carbon atoms and $R_c$ and $R_d$ are individually a linear or branched alkyl group of 1 to 8 carbon atoms, more preferably 1 or 2 to 4 carbon atoms or $R_c$ and $R_d$ connect together to form a single linear or branched alkylene group of 1 to 8 carbon atoms or optionally with one of $R_c$ and $R_d$ is connected to $R_b$ at a carbon atom, more desirably $R_c$ and $R_d$ being 1 or 2 to 4 carbon atoms. Such diamines include Ethacure™ 90 from Albermarle (supposedly a N,N'-bis(1,2,2-trimethylpropyl)-1,6-hexanediamine); Clearlink™ 1000 or Jefflink™ 754 both from Huntsman; N-methylaminoethanol; dihydroxy terminated, hydroxyl and amine terminated or diamine terminated poly(alkyleneoxide) where the alkylene has from 2 to 4 carbon atoms and having molecular weights from 100 to 2000; N,N'-diisopropyl-1,6-hexanediamine; N,N'-di(sec-butyl) phenylenediamine; piperazine, homopiperazine; and methyl-piperazine. Jefflink™754 has the structure

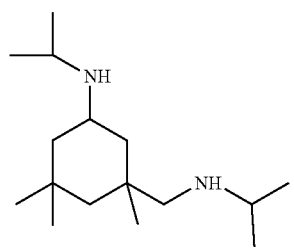 [SMILES: CC(C)NCC1(C)CC(NC(C)C)CC(C)(C)C1]

Clearlink™ 1000 has the structure

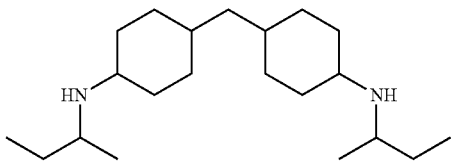 [SMILES: CCC(C)NC1CCC(CC2CCC(NC(C)CC)CC2)CC1]

Another diamine with an aromatic group is: N,N'-di(sec-butyl) phenylenediamine, see structure below:

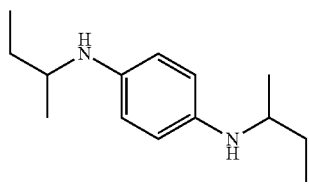 [SMILES: CCC(C)Nc1ccc(NC(C)CC)cc1]

Preferred diamines are diamines wherein both amine groups are secondary amines.

Preferred lactams include straight chain or branched alkylene segments therein of 4 to 12 carbon atoms such that the ring structure, without substituents on the nitrogen of the lactam, has 5 to 13 carbon atoms total (when one includes the carbonyl) and the substituent on the nitrogen of the lactam (if the lactam is a tertiary amide) is an alkyl of from 1 to 8 carbon atoms and more desirably an alkyl of 1 to 4 carbon atoms. Dodecyl lactam, alkyl substituted dodecyl lactam, caprolactam, alkyl substituted caprolactam, and other lactams with larger alkylene groups are preferred lactams as they provide repeat units with lower Tg values. Aminocarboxylic acids have the same number of carbon atoms as the lactams. Desirably, the number of carbon atoms in the linear or branched alkylene group between the amine and carboxylic acid group of the aminocarboxylic acid is from 4 to 12 and the substituent on the nitrogen of the amine group (if it is a secondary amine group) is an alkyl group with from 1 to 8 carbon atoms, more preferably 1 or 2 to 4 carbon atoms. Aminocarboxylic acids with secondary amine groups are preferred.

In one embodiment, desirably at least 50 wt. %, more desirably at least 60, 70, 80 or 90 wt. % of said polyamide oligomer or telechelic polyamide comprise repeat units from diacids and diamines of the structure of the repeat unit being

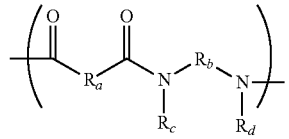

wherein $R_a$ is the alkylene portion of the dicarboxylic acid and is a cyclic, linear, or branched (optionally including aromatic groups) alkylene of 2 to 36 carbon atoms, optionally including up to 1 heteroatom per 3 or 10 carbon atoms of the diacid, more preferably from 4 to 36 carbon atoms (the diacid would include 2 more carbon atoms than the alkylene portion) and wherein $R_b$ is a direct bond or a linear or branched (optionally being or including cyclic, heterocyclic, or aromatic portion(s)) alkylene group (optionally containing up to 1 or 3 heteroatoms per 10 carbon atoms) of 2 to 36 or 60 carbon atoms and more preferably 2 or 4 to 12 carbon atoms and $R_c$ and $R_d$ are individually a linear or branched alkyl group of 1 to 8 carbon atoms, more preferably 1 or 2 to 4 carbon atoms or $R_c$ and $R_d$ connect together to form a single linear or branched alkylene group of 1 to 8 carbon atoms or optionally with one of $R_c$ and $R_d$ is connected to $R_b$ at a carbon atom, more desirably $R_c$ and $R_d$ being an alkyl group of 1 or 2 to 4 carbon atoms.

In one embodiment, desirably at least 50 wt. %, more desirably at least 60, 70, 80 or 90 wt. % of said polyamide oligomer or telechelic polyamide comprise repeat unit units from lactams or amino carboxylic acids of the structure

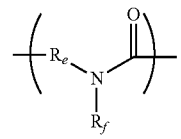

Repeat units can be in a variety of orientations depending on initiator type in the oligomer, derived from lactams or amino carboxylic acid wherein each $R_e$ independently is linear or branched alkylene of 4 to 12 carbon atoms and each $R_f$ independently is a linear or branched alkyl of 1 to 8 (more desirably 1 to 4) carbon atoms.

The above described polyamide oligomers and telechelic polyamide are useful to make prepolymers by reacting the polyamide oligomer or telechelic polyamide with polyisocyanates. Polyisocyanates will be used in this specification to refer to isocyanate containing species having two or more isocyanates groups per molecule. Desirably, the polyamide oligomers and telechelic polyamide have terminal groups reactive with isocyanates to form urea linkages and/or urethane linkages. Groups chemically reactive with isocyanates to form chemical linkages are known as Zerewitnoff groups and include primary and secondary amines and primary and secondary alcohols. The nitrogen of the primary or secondary amine bonds to a carbonyl of the isocyanate and a hydrogen from the primary or secondary amine moves from the amine and bonds to the NH group of the isocyanate. The oxygen of a primary or secondary alcohol bonds to the carbonyl of the isocyanate and a hydrogen from the hydroxyl group of the alcohol moves and bonds to the NH group of the isocyanate.

During the reaction of the polyamide oligomers or telechelic polyamides with the polyisocyanates, one can have other species present with Zerewitinoff groups to co-react into the resulting polymer network. These can be low molecular weight species (say less than 500 g/mole diols or diamines) or higher molecular weight species (say 500 to 5000 g/mole oligomers that are added to form the high or low Tg phases in the resulting polymer). Generally, if one wants to make a polymer dispersion in water, one only reacts the components with a stoichiometry imbalance between the reactive groups to create moderate molecular weight species called a prepolymer with the functional group present in excess being the dominant terminus of most prepolymer units. This is usually accomplished by keeping the stoichiometry of the isocyanate groups to Zerewitinoff groups away from the 1:1 ratio (such that isocyanate or Zerewitinoff group terminated prepolymers of limited molecular weight are produced). The molecular weight of the prepolymer is kept fairly low (5000 g/mole to 100,000 g/mole) so that the prepolymer is a liquid at room temperature or slightly above room temperature (generally up to about 80° C.). This facilitates mixing of the prepolymer and dispersing of the prepolymer as small colloidally stable particles in water without the viscosity of the prepolymer interfering. Often an excess of isocyanate groups are used so that the prepolymer is isocyanate terminated.

The molecular weight of the prepolymer can be increased (or it is sometimes referred to as chain extending the prepolymer into a urethane polymer) after the dispersion of prepolymer is made. This can be done by adding to the dispersion low molecular weight species such as diols, triols, tetrols, or diamines, triamines or tetraamines that can react with isocyanate terminated prepolymers linking them into higher molecular weight species. Isocyanate groups on the prepolymer can also react with water in the continuous to generate $CO_2$ gas and terminal amine groups on some of the prepolymer. The amine groups on some of the prepolymer can then react with isocyanate groups on other prepolymers and chain extend both species. While the following paragraphs describe dispersing groups that can be incorporated into the prepolymer/polymer, it is also possible to utilize dispersants and surfactants of the anionic, cationic, nonionic, or zwitterionic type or mixtures thereof to facilitate the dispersion of the prepolymer/polymer in a continuous media.

Dispersing species such as anionic, cationic, nonionic, or zwitterionic species are desirably added to the prepolymer (or polymer) if it is desired to disperse the prepolymer (or polymer) in a continuous aqueous phase. These dispersing species help to provide colloidal stabilization to the dispersed phase. If surface active dispersing groups are to be incorporated into the polymer, it is desirable to include them in the reaction of the polyamide oligomer or telechelic polyamide (e.g. during the prepolymer preparation). Dispersing groups that have Zerewitinoff active groups, which react with isocyanate groups to form urea or urethane linkages, are particularly preferred for this purpose.

Polyureas and polyurethanes made from polyamide oligomers or telechelic polyamides are generally hydrophobic and not inherently water-dispersible. Therefore, at least one water-dispersability enhancing compound, i.e., a monomer with a dispersing functionality, which has at least one, hydrophilic, ionic or potentially ionic group is optionally included in the reactants for the polyurea or polyurethane polymers and prepolymers of this invention to assist dispersion of the polymer/prepolymer in water. Typically, this is done by incorporating a compound bearing at least one hydrophilic group or a group that can be made hydrophilic, e.g., by chemical modifications such as neutralization, into the polymer/prepolymer chain. These compounds may be of a nonionic, anionic, cationic or zwitterionic nature or the combination thereof. For example, anionic groups such as carboxylic acid groups can be incorporated into the prepolymer and subsequently ionized by a salt-forming compound, such as a tertiary amine defined more fully hereinafter. Anionically dispersible prepolymers/polymers based on carboxylic acid groups generally have an acid number from about 1 to about 60 mgKOH/gram, typically 1 to about 40, or even 10 to 35 or 12 to 30 or 14 to 25 mg KOH/gram. Other water-dispersibility enhancing compounds can also be reacted into the prepolymer backbone through urethane linkages or urea linkages, including lateral or terminal hydrophilic ethylene oxide or ureido units.

Water dispersability enhancing compounds of particular interest are those which can incorporate weak carboxyl groups into the prepolymer. Normally, they are derived from hydroxy-carboxylic acids having the general formula $(HO)_xQ(COOH)_y$, wherein Q is a straight or branched hydrocarbon radical containing 1 to 12 carbon atoms, and x and y are 1 to 3. Examples of such hydroxy-carboxylic acids include dimethylol propanoic acid, dimethylol butanoic acid, citric acid, tartaric acid, glycolic acid, lactic acid, malic acid, dihydroxymalic acid, dihydroxytartaric acid, and the like, and mixtures thereof. Dihydroxy-carboxylic acids are more preferred with dimethylol propanoic acid and dimethylol butanoic acid being most preferred.

Another group of water-dispersability enhancing compounds of particular interest are side chain hydrophilic monomers. Some examples include alkylene oxide polymers and copolymers in which the alkylene oxide groups have from 2-10 carbon atoms as shown, for example, in U.S. Pat. No. 6,897,281, the disclosure of which is incorporated herein by reference.

Water dispersability enhancing compounds can impart cationic nature onto polyurethane. Cationic polyurethanes contain cationic centers built into or attached to the backbone. Such cationic centers include ammonium, phosphonium and sulfonium groups. These groups can be polymerized into the backbone in the ionic form or, optionally, they can be generated by post-neutralization or post-quaternization of corresponding nitrogen, phosphorous, or sulfur moieties. The combination of all of the above groups can be used as well as their combination with nonionic stabilization. Examples of amines include N-methyldiethanol amine and aminoalcohols available from Huntsman under Jeffcat® trade name such as DPA, ZF-10, Z-110, ZR-50 and alike. They can make salts with virtually any acid. Examples of acid include hydrochloric, sulfuric, acetic, phosphoric, nitric, perchloric, citric, tartaric, chloroacetic, acrylic, methacrylic, itaconic, maleic acids, 2-carboxyethyl acrylate and other. Quaternizing agents include methyl chloride, ethyl chloride, alkyl halides, benzyl chloride, methyl bromide, ethyl bromide, benzyl bromide, dimethyl sulfate, diethyl sulfate, chloroacetic, acids and alike. Examples of quaternized diols include dimethyldiethanolammonium chloride and N,N-dimethyl-bis(hydroxyethyl) quaternary ammonium methane sulfonate. Cationic nature can be imparted by other post-polymerization reactions such as, for example, reaction of epoxy quaternary ammonium compounds with carboxylic group of dimethylol propanoic acid.

Other suitable water-dispersability enhancing compounds include thioglycolic acid, 2,6-dihydroxybenzoic acid, sulfoisophthalic acid, polyethylene glycol, and the like, and mixtures thereof.

Although the use of water-dispersability enhancing compounds is preferred, dispersions of the present inventions can be prepared without them by using high-shear dispersing methods and stabilizing by surfactants.

(i) Polyisocyanate

Suitable polyisocyanates have an average of about two or more isocyanate groups, preferably an average of about two to about four isocyanate groups per molecule and include aliphatic, cycloaliphatic, araliphatic, aromatic, and heterocyclic polyisocyanates, as well as products of their oligomerization, used alone or in mixtures of two or more. Diisocyanates are more preferred.

Specific examples of suitable aliphatic polyisocyanates include alpha, omega-alkylene diisocyanates having from 5 to 20 carbon atoms, such as hexamethylene-1,6-diisocyanate, 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate, and the like. Polyisocyanates having fewer than 5 carbon atoms can be used but are less preferred because of their high volatility and toxicity. Preferred aliphatic polyisocyanates include hexamethylene-1,6-diisocyanate, 2,2,4-trimethyl-hexamethylene-diisocyanate, and 2,4,4-trimethyl-hexamethylene diisocyanate.

Specific examples of suitable cycloaliphatic polyisocyanates include dicyclohexylmethane diisocyanate, (commercially available as Desmodur™ W from Bayer Corporation), isophorone diisocyanate, 1,4-cyclohexane diisocyanate, 1,3-bis-(isocyanatomethyl) cyclohexane, and the like. Preferred cycloaliphatic polyisocyanates include dicyclohexylmethane diisocyanate and isophorone diisocyanate.

Specific examples of suitable araliphatic polyisocyanates include m-tetramethyl xylylene diisocyanate, p-tetramethyl xylylene diisocyanate, 1,4-xylylene diisocyanate, 1,3-xylylene diisocyanate, and the like. A preferred araliphatic polyisocyanate is tetramethyl xylylene diisocyanate.

Examples of suitable aromatic polyisocyanates include 4,4'-diphenylmethylene diisocyanate, toluene diisocyanate, their isomers, naphthalene diisocyanate, and the like. Preferred aromatic polyisocyanates include 4,4'-diphenylmethylene diisocyanate and toluene diisocyanate.

Examples of suitable heterocyclic isocyanates include 5,5'-methylenebisfurfuryl isocyanate and 5,5'-isopropylidenebisfurfuryl isocyanate.

Polyamide-based polyurea/urethane compositions were made in waterborne dispersion form with high molecular weight, e.g. Mw>80 000 g/mol, high solid content, e.g. 25-40 wt. %, various particle size, e.g. 40-200 nm. The dispersions were made with NMP, N-methylpyrrolidone, solvent, e.g. 0-11% in formulation, or with solvent process (NMP-free method) using IPA.

Good quality, clear, colorless (or very faint yellow color) polyurea and or polyurethane with polyamide segment in the form of films formed from the dispersion. The films had high tensile strength, e.g. 35,000-55,000 psi, moderate elongation, e.g. 250-300%, films.

We made a series of polyamide oligomers from conventional difunctional acids and amines. These oligomers contained amine terminations and in reaction with diisocyanates form polyamide-polyurea backbone. The polyamide building blocks in our new dispersion polymers provide excellent hydrolytic stability, superior heat and UV resistance, and better overall mechanical properties in comparison to polyester and polyether segments. In addition, the amine chain termination in these polyamide oligomers forms urea linkages (vs. urethane link from polyol) in reaction with isocyanates. These polyurea linkages are known to have stronger intermolecular attractions that act more like a true crosslinked polymer, resulting in performance advantages over urethanes, including but not limited to better solvent resistance and elasticity.

Conventional Blends with Other Polymers

The dispersions of this invention can be combined with compatible polymers and polymer dispersions by methods well known to those skilled in the art. Such polymers, polymer solutions, and dispersions include those described in A. S. Teot. "Resins, Water-Soluble" in: Kirk-Othmer Encyclopedia of Chemical Technology. John Wiley & Sons. 3rd Edn., Vol. 20, H. F. Mark et al. Eds., pp. 207-230 (1982).

Composite Polymer Compositions (e.g. Polyurea/Urethane with Free Radically Polymerizable Monomers) Providing Better Interpenetration of Phases In this embodiment, one can use ethylenically unsaturated monomer(s) as a solvent to reduce the viscosity of the prepolymer during preparation and dispersion of the prepolymer or polyurea/urethane and subsequently polymerize the unsaturated monomer(s) to form a polymer. Ethylenically unsaturated monomers and other free radically polymerizable monomers can be polymerized by conventional free radical sources to form a polymer within the polyurea/urethane particle to form a composite polymer with the polyurea/urethane polyamide of the dispersion. Vinyl polymers is a generic term for polymers derived from substantial portions of unsaturated monomers or polymers derived from those monomers. Acrylic, often considered a subset of vinyl, will refer to acrylic acid, acrylates, being esters of acrylic acid, and alkacrylates, such as methacrylates and ethacrylates, and polymers therefrom. Additional free-radically polymerizable material, e.g. other unsaturated monomers, may be added to the vinyl or acrylic monomers to copolymerize. These other monomers can be monomers such as maleic anhydride, maleic acid, and other monomers where the carbon-carbon double bond is nearly as reactive (and copolymerizable with) as a ethylenically unsaturated monomers. Dienes are considered ethylenically unsaturated and copolymerize with both the broad category of vinyl monomers and narrow category of acrylic monomers.

The polymerization within the polyurethane particles can be done by forming the aqueous dispersions of polyurea/urethane composite and then polymerizing additional monomers by emulsion or suspension polymerization in the presence of these dispersions. Another way of making composite polymers is to include ethylenically unsaturated monomers in the polyurea/urethane prepolymer, e.g. either with the reactants to form the prepolymer and/or any time before the urethane prepolymer is dispersed, and cause these monomer to polymerize before, during and/or after the prepolymer is dispersed in aqueous medium. In one embodiment, the weight percent of polymer(s) from vinyl monomers based on 100 parts of combined urea/urethane and vinyl (or acrylic in narrower embodiments) will be at least 1, 5, or 10 weight percent with the complementary amount of urea/urethane prepolymer or polymer to make 100 parts by weight total. In another embodiment, where small amounts of urea/urethane prepolymer or polymer are desired, the urea/urethane prepolymer or polymer is at least 0.1, 0.5, 1, 5 or 10 weight percent of the combined weight and the vinyl (or acrylic in narrower embodiments) polymer is the complementary amount.

In one approach, the ethylenically unsaturated monomers act as a diluent (or plasticizer) during prepolymer formation. When the vinyl monomers are used as a diluent for the polyurea/urethane component then the vinyl monomers will be from about 5 or 10 weight percent to about 50 weight percent of the combined weight of the polyurea/urethane and vinyl component (monomer or polymer, depending on whether polymerization has occurred or not). Composites of polyurea/urethanes of this invention with and acrylics can be made by any of these approaches. In one embodiment, the telechelic polyamides with alcohol terminal groups are useful to form polyurethanes and polyurethane dispersions in water with lower processing temperatures and lower minimum film formation temperatures than similar polymer dispersions where secondary amino groups are in the position of the terminal hydroxyl groups. These can result in better films or the ability to incorporate more polyamide in a polymer dispersion or higher melting polyamide in a polymer dispersion. It is desirable that these alcohol terminal groups are derived from reacting aminoalcohols having secondary amino groups with carboxylic acid terminated polyamides as described in paragraph 0040. This is because the secondary amino groups form urea linkages with di or polyisocyanates and hydroxyl groups for urethane linkages with di or polyisocyanates. Urea linkages result in polymers that require higher processing temperatures and have higher minimum film formation temperatures than urethane linkages in similar polymers.

Broadened Definition of Composite and/or Hybrid Polymer in Dispersion in Water

As composite and/or hybrid polymers dispersed in aqueous media (water) with significant amounts of polyamide segments therein have not be extensively disclosed in the literature and said composite and/or hybrid polymers can have desirable lower film formation temperature, better adhesion to some polar substrates, better elongation to break, better tensile strength, better retention of properties after aging, etc. than current urethane and/or polyamide compositions on the market. Composites and/or hybrid compositions can allow one to adjust the weight percentage of polyamide repeat units relative to other repeat units (e.g. optionally polyether, polycarbonate, polyester segments, polysiloxane, etc.) in the condensation polymer to optimize the modulus at a particular temperature or to move the minimum film formation temperature up or down by adding softer or harder polymer segments relative to the polyamide. Condensation polymer is a generic term for polymers made by coupling reactive groups like amine, carboxylic acid, isocyanates, hydroxyl, etc. in to form chemical bonds (as opposed to free radical chain polymerizations). Composite and/or hybrid compositions also allow adjustment of the weight percentage of polyamide by increasing the weight percentage of vinyl polymer without increasing the amount of polyamide. Thus this technology provides several ways to independently control the amount of polyamide in the composite particles, which can have effects on the polarity or hydrogen bonding of the composite particles, the surface tension of the composite particles, and/or the modulus, tensile strength, etc. of the composite polymer at a particular key temperature.

By the term composite and/or hybrid we intend to include a variety of mixtures of other polymers with a polyamide rich polymer type. A focus of this disclosure is ways to add polyamide segments to a polymer dispersion in water such that desirably features of polyamide can be achieved without some detrimental features such as high polymer processing temperatures. The polymers that contain polyamide segments may have other comonomers or comonomer segments linked directly or indirectly to the polyamide segments. These comonomers can include things like polyethers, polyesters, polycarbonates, polysiloxanes, etc. The composite and/or hybrid polymers of the composite and/or hybrid dispersions have approximately the same particle size ranges as disclosed for the polyamide dispersions in water.

The composite and/or hybrid polymer dispersions may have within the polymer comprising polyamide segments anionic, nonionic, or zwitterionic colloidal stabilizing groups as earlier disclosed for the polyamide dispersions in water.

In one embodiment, we disclose a composite and/or hybrid polymer dispersion in the form of dispersed hybrid polymer particles in aqueous medium, said composite and/or hybrid polymer dispersion comprising at least 5 wt. % (in some embodiments more desirably at least 10, 15, 20, 30 or 40 wt. %) of polyamide segments derived from amide forming condensation polymerization of monomers selected from diamines, amino carboxylic acids, lactams, and dicarboxylic acids, said wt. % based on the weight of said hybrid polymer dispersion in aqueous medium, said polyamide segments characterized as the entire weight of repeat units from said monomers having terminal amide linkage(s) at one or both ends of repeat units from said monomers. In a more preferred embodiment, said amide linkages are characterized as being at least 50, 70, 90, or 95 mole % amides linkages of the type formed from the reaction of a secondary amine with a carboxylic acid (i.e., a tertiary amide linkage). We note that lactam monomers forming tertiary amide linkages start out as tertiary amide linkages, ring open, and then form polymers with tertiary amide linkages. We intend the above language regard amide linkage of the type formed from secondary amines reacted with carboxylic acid to include those derived from lactams with tertiary amide linkages.

The composite particles also comprise at least 5 wt. % based on the weight of said particles (in some embodiments more desirably at least 10, 15, 20, 30 or 40 wt. %) of a vinyl polymer interspersed with said polyamide segments within the same polymer particles as said polyamide segments, wherein said vinyl polymer is derived from the free radical polymerization of one or more vinyl monomers in the presence of said polyamide segments (vinyl monomers being defined in this context as having at least alpha-beta unsaturation and desirably having from 3 to about 30 carbon atoms, including but not limited to (alk)acrylates, vinyl esters, unsaturated amides, acrylonitrile, dienes, styrene, AMPs monomer, etc.), and water. The water can be present in amounts from about 10, 20, or 30 weight percent of the polymer dispersion to about 70, 80, or 90 wt. % of the polymer dispersion. Typically, lower water content saves on shipping costs for the same amount of polymer but viscosity of the dispersions tend to rise when the water content is minimized.

In one embodiment, it is desirable that the polymer containing the polyamide segments be partially crosslinked to increase the physical properties of the polymer such as tensile strength and modulus. In one embodiment, the amount of ketone crosslinkable functional groups in the composite or hybrid polymer will be at least 0.05 milliequivalents per gram of said polymer dispersion, or up to about 1 milliequivalent, preferably from about 0.05 to about 0.5 milliequivalent, and more preferably from about 0.1 to about 0.3 milliequivalent per gram of said polymer dispersion. In that embodiment the ketone groups can be on the polyamide containing polymer or the vinyl polymer. In another embodiment, said composite or hybrid polymer dispersion has at least 10, 20, 30, 40 or 50 wt. % of said polyamide segments chemically bonded into polymers comprising on average one or more ketone groups per said polymer. In another embodiment, said polymer dispersion further comprises hydrazine and/or hydrazide groups (sometimes in the form of low molecular weight species and sometimes in the form of polymers with hydrazide groups) in an amount from 10 mole % to about 200 mole % of hydrazine and/or hydrazide groups based on the moles of said ketone groups. This provides for a ketone chemical reaction with hydrazine forming a chemical bond that can function as chemical crosslinking. Typically, when adding hydrazine for crosslinking one doesn't use an excess of hydrazine because of potential undesirable reactions of hydrazine on humans. In one embodiment, the amount of hydrazine or hydrazide groups is desirably from about 20 to 100 mole % of the amount of ketone functional groups.

In one embodiment, said hydrazine and/or hydrazide groups are part of a reactive hydrazine or hydrazide compound of less than 400, 300 or 220 g/mole molecular weight (such as adipic acid dihydrazide). In another embodiment, said hydrazide groups are present and said hydrazide groups are part of a hydrazide reactive oligomeric or polymeric chemical compound of 300 or 400 g/mole to 500,000 g/mole molecular weight.

In another embodiment, said vinyl polymer comprises on average one or more (more desirably up to about 1 milliequivalent, preferably from about 0.05 to about 0.5 milliequivalent, and more preferably from about 0.1 to about 0.3 milliequivalent per gram of vinyl polymer on a dry vinyl polymer weight basis) ketone groups per vinyl polymer and said dispersion further comprises hydrazine and/or hydrazide groups in an amount from 10 mole % to about 200 mole % based on the moles of said ketone groups.

The ketone-hydrazine crosslinking described above is well known in the urethane and acrylic polymer dispersion art as effective crosslinkers for polymeric dispersions at around room temperature upon evaporation of volatile base and shift of the solution pH from slightly basic to neutral or pH acid. The author Anthony D. Pajerski has several patents on urethanes and related compounds in water crosslinked or increased in molecular weight by ketone-hydrazine crosslinking. This technology is also sometimes known as azomethine linkages.

Air-oxidizable, self-crosslinkable (unsaturation) crosslinkers can also be conveyed into the polymer of the composite or hybrid dispersion. The self-crosslinkable groups can be inserted into the polymer backbone via active hydrogen containing (isocyanate-reactive) unsaturated fatty acid ester polyol(s) (e.g., oil modified polyols). The resulting unsaturation in the polymer imparts air curable latent crosslinkability so that when a coating composition containing such a component is dried in the air (often in conjunction with a drier salt) the coating undergoes a self-crosslinking reaction. By isocyanate reactive is meant that the unsaturated fatty acid polyol contains at least two hydroxyl groups (containing active hydrogen atoms) that are available for reaction with the isocyanate groups on the polyisocyanate. The oil modified polyols employed in the invention are conventional in the art. They are generally produced by reacting a polyfunctional alcohol (polyol) with a drying oil (glyceride) or a free fatty acid. The fatty acid component(s) of the drying oils and free fatty acids are characterized by containing at least one olefinic carbon-carbon double bond and can have two, three or more olefinic double bonds. The amount of unsaturated fatty acid ester polyol (or drying oil) to utilize will depend on many factors such as the degree of flexibility desired in the final composition and the nature and the amount of the other reactants used in the prepolymer formation as well as the degree and rate of air curing that is desired for the polymer.

Unsaturated fatty acid ester polyols also can be obtained by reacting an unsaturated fatty acid with an epoxy group containing compound. In one aspect of the invention the polyfunctional alcohols which can be used to prepare the oil modified polyols generally contain from 2 to about 12 carbon atoms. In another aspect of the invention, polyfunctional acids and acid anhydrides can be reacted with polyfunctional alcohols to obtain polyester polyols for use as a polyfunctional alcohol. Such acids and anhydrides useful in this aspect of the invention generally contain from 4 to about 36 carbon atoms. The unsaturated fatty acids which can be utilized in the preparation of the oil modified polyols of the invention include the ethylenically unsaturated and polyunsaturated fatty acids and their esters. The fatty acids can contain from 1 to about 3 olefinic double bonds or more and include conjugated and non-conjugated unsaturation. It is intended that the fatty acids encompass and include all natural and synthetic positional isomers with respect to the location of the unsaturated carbon-carbon double bonds. In another aspect of the invention, the fatty acids contain two to three unsaturated double bonds. The unsaturated fatty acids that can be employed in preparing the oil modified polyol include but are not limited to those formed by the hydrolysis of any of the so called drying or semidrying oils, such as linseed oil, poppyseed oil, tung oil, etc. Synthetically modified unsaturated fatty acids also can be employed in the preparation of the unsaturated fatty acid ester polyols of the invention. The properties of unsaturated fatty acids and their derivatives can be altered by rearrangement, i.e., isomerization, of the structure of the double bond, either with respect to the steric position or the position in the carbon chain of the molecule of the fatty acid.

The composite and/or hybrid polymer dispersion may further comprise from about 0.5 to about 10 wt. % of $C_1$ or $C_3$ to $C_{12}$ secondary alcohols based on the weight of said dispersion to function as simple hydrogen bonding donating components to the polyamide segments and soften or plasticize the composition (to enhance film formation at lower temperatures or lower viscosity during the dispersion process). The composite and/or hybrid polymer dispersion may also comprise alkylene oxide glycol ethers of less than 300 or 400 g/mole molecular weight in amounts of about 0.5 to about 10 wt. % of the polymer dispersion. The composite and/or hybrid polymer dispersion may also comprise anionic, nonionic, or zwitterionic surfactants to help colloidally stabilize the dispersion.

The composite and/or hybrid polymer dispersion may be further comprising from about 1 to about 10 wt. % of a polysiloxane chemically bonded directly or indirectly to one or more of said polyamide segments. Polysiloxane polyols are characterized by the presence of the —Si($R_1$)($R_2$)—O— repeat units which can contain $C_1$-$C_3$-alkyl or aryl groups such as polydimethylsiloxanes, poly(dimethysiloxane-co-diphenylsiloxane)s, polydiphenylsiloxanes, poly(methylphenyl)siloxanes and the like, and combinations thereof. Examples include ethoxylated poly(dimethylsiloxane) (PDMS) Y-17256 from Momentive Performance Materials and side-chain PDMS diol MCR-$C_{61}$ from Gelest.

A composite and/or hybrid polymer dispersion according to earlier disclosures may further comprise urea and/or urethane linkages bonded directly or indirectly to one or more of said polyamide segments. This uses the polyamide segment (wherein a majority of amide linkages tertiary amide linkages as previously discussed) and the segments of polyamide are sometimes or often linked with urethane or urea linkages derived from reacting polyisocyanates with hydroxyl and/or amine groups. Thus the polyamide segments would be chain extended by urethane or urea linkages. In one embodiment, where amine (primary or secondary) reactive groups are reacted with isocyanate groups, there are on average at least 4 urea linkages per every 20 amide linkages in said polymer. In another embodiment, where urethane linkages are preferred and made from reaction of hydroxyl terminated segments with isocyanate groups, there are on average at least 4 urethane linkages per every 20 amide linkages in said polyamide segments.

Processes

Aqueous dispersions of polyurea/urethane particles are made in accordance with this invention by forming the polyurea/urethane prepolymer in the substantial absence of water (as water reacts with isocyanate groups) and then dispersing this prepolymer in aqueous medium. This can be done in any of the methods known to the art. Typically, prepolymer formation will be done by bulk or solution polymerizing the ingredients of the prepolymer.

Once the polyurea/urethane prepolymer mixture is formed, optionally with dispersing moieties incorporated into said prepolymer/polymer, it is dispersed in an aqueous medium to form a dispersion or a solution. Dispersing the prepolymer in aqueous medium can be done by any conventional technique in the same way that polyurethane prepolymers made by bulk or solution polymerization are dispersed in water. Normally, this will be done by combining the prepolymer blend with water with mixing. Where solvent polymerization is employed, the solvent and other volatile components can optionally be distilled off from the final dispersion, if desired. Where the prepolymer includes enough water-dispersibility enhancing compound, e.g. anionic, cationic, and/or nonionic monomers, to form a stable dispersion without added emulsifiers (surfactants), the dispersion can be made without such compounds, i.e., substantially free of surfactants, if desired. The advantage of this approach is that the coatings or other products made from the polyurea/urethane without low molecular weight surfactants exhibit less water sensitivity, often better film formation and less foaming.

Other known ways of making aqueous polyurethane dispersions can also be used to make the dispersions of this invention. Their review can be found in several publications including by D. Dieterich in *Progress in Organic Coatings*, vol. 9, pp. 281-340 (1981). Examples of the processes include:

Shear Mixing—Dispersing the prepolymer by shear forces with emulsifiers (external emulsifiers, such as surfactants, or internal emulsifiers having anionic, nonionic, cationic and/or zwitterionic groups as part of or pendant to the polymer backbone, and/or as end groups on the polymer backbone).

Acetone process—A prepolymer is formed with or without the presence of acetone, MEK, and/or other polar solvents that are non-reactive with isocyanates and easily distilled. The prepolymer is further diluted in said solvents as necessary, and chain extended with an active hydrogen-containing compound. Water is added to the chain-extended polymer, and the solvents are distilled off. A variation on this process would be to chain extend the prepolymer after its dispersion into water.

Melt dispersion process—An isocyanate-terminated prepolymer is formed, and then reacted with an excess of ammonia or urea to form a low molecular weight oligomer having terminal urea or biuret groups. This oligomer is dispersed in water and chain extended by methylolation of the biuret groups with formaldehyde.

Ketazine and ketimine processes—Hydrazines or diamines are reacted with ketones to form ketazines or ketimines. These are added to a prepolymer, and remain inert to the isocyanate. As the prepolymer is dispersed in water, the hydrazine or diamine is liberated, and chain extension takes place as the dispersion is taking place.

Continuous process polymerization—An isocyanate-terminated prepolymer is formed. This prepolymer is pumped through high shear mixing head(s) and dispersed into water and then chain extended at said mixing head(s), or dispersed and chain extended simultaneously at said mixing head(s). This is accomplished by multiple streams consisting of prepolymer (or neutralized prepolymer), optional neutralizing agent, water, and optional chain extender and/or surfactant.

Reverse feed process—Water and optional neutralizing agent(s) and/or extender amine(s) are charged to the prepolymer under agitation. The prepolymer can be neutralized before water and/or diamine chain extender is added.

Additives and Applications

Because the polyamide and the urea linkages have higher softening temperatures than polyethers, polyesters, and urethane linkages, it is desirable to include coalescing aids in the prepolymers and polymer dispersions of this disclosure to help promote coalescence at the desired temperature of the polymer particles with each other and with any solid additives in the compositions. Coalescing aids can also be known as solvents or plasticizers, depending on their function. One coalescing aid is the vinyl monomers earlier discussed with composite polymer blends. Preferred vinyl monomers include methyl methacrylate, butyl acrylate, ethylhexyl acrylate, ethyl acrylate and styrene. Coalescing solvents include diethylene glycol dimethyl ether, dipropylene glycol dimethyl ether, dimethylcarbonate, isopropyl alcohol, dibutylene glycol dimethyl ether, and Texanol (isobutyric ester of 2,2,4-trimethyl-1,3-pentanediol).

Neutralization agents can optionally be employed in the dispersions of the invention and the coating compositions prepared from such dispersions. The pH of the compositions can range from about 7 to about 10. Suitable neutralization agents include but are not limited to alkali hydroxides such as lithium, sodium and potassium, and organic bases such as ammonia and tertiary amines such as triethanolamine, aminomethyl propanol, dimethyl ethanol amine, trimethyl amine, triethylamine morpholine, and mixtures thereof.

Crosslinkers

Compounds having at least one crosslinkable functional group can also be incorporated into the polyurea/urethane of the present invention, if desired. Examples of such compounds include those having carboxylic, carbonyl, amine, hydroxyl, epoxy, acetoacetoxy, olefinic and hydrazide groups, blocked isocyanates, and the like, and mixtures of such groups and the same groups in protected forms which can be reversed back into original groups from which they were derived. Other suitable compounds providing crosslinkability include thioglycolic acid, 2,6-dihydroxybenzoic acid, melamine and its derivatives, multivalent metal compounds and the like, and mixtures thereof.

The amount of optional compounds having crosslinkable functional groups in the prepolymer will typically be up to about 1 milli-equivalent, preferably from about 0.05 to about 0.5 milli-equivalent, and more preferably from about 0.1 to about 0.3 milli-equivalent per gram of final polyurethane on a dry weight basis.

Other additives well known to those skilled in the art can be used to aid in preparation of the dispersions of this invention. Such additives include surfactants, stabilizers, defoamers, thickeners, leveling agents, antimicrobial agents, antioxidants, UV absorbers, fire retardants, pigments, dyes, and the like. These additives can be added at any stage of the manufacturing process.

The dispersions of this invention typically have total solids of at least about 20 weight percent in one aspect, at least about 30 weight percent in another aspect, and at least about 40 weight percent in a further aspect, and about 45 weight percent in still another aspect, based on the weight of the total coating composition.

As coating compositions or adhesives, they may be applied to any substrate including wood, metals, glass, cloth, leather, paper, plastics, foam and the like, by any conventional method including brushing, dipping, flow coating, spraying, and the like.

The compositions of the present invention and their formulations are useful as self-supporting films, coatings on various substrates, or adhesives with longer useful lifetimes than similar polyurethane compositions or other improved properties.

Working Examples

Polyamide oligomers formulated into dispersions in water were then formulated into coating recipes to illustrate the desirability of these polyamides in coatings for wood, metal, plastic and masonry.

Polyamides were first formed according to the procedures below and recipes in Table 1.

Polyamide 1

Hydrogenated dimer acid and piperazine were charged. The reactor was then heated to 150° C. for 1 hour, and to 180° C. for 1 hour. The temperature was increased to 240° C. and the monomers were polymerized for 8 hours at atmospheric pressure. The temperature then was decreased to 180° C. Caprolactone was charged and reacted at 180° C. for 6 hours at atmospheric pressure, then vacuum was applied at 180° C. for 1 hour. The product was a slightly yellowish paste at room temperature with an acid number <3.0 mg KOH/g polymer. The end-groups were hydroxyls.

Polyamide 2

Hydrogenated dimer acid and piperazine were charged. The reactor was then heated to 150° C. for 1 hour, and to 180° C. for 1 hour. The reactor temperature was increased to 240° C. The monomers were polymerized for 8 hours at atmospheric pressure then the temperature was decreased to 180° C. Caprolactone was charged and reacted at 180° C. for 6 hours at atmospheric pressure, then vacuum was applied at 180° C. for 1 hour.

Polyamide 3

Hydrogenated dimer acid, sebacic acid, and piperazine were charged to the reactor under $N_2$ atmosphere. The reactor was then heated to 200° C. and the polymer formed for 4 hours. The reactor was cooled to 160° C. and 2-(methylamino)ethanol was added to the reactor. The polymer continued to form for 12 hours. The reactor was heated to 200° C. and vacuum was applied for 30 minutes. The product was a slightly yellowish paste at room temperature with an acid number <3.0 mg KOH/g polymer. The end-groups were hydroxyls.

Polyamide 4

Hydrogenated dimer acid and piperazine were charged. The reactor was then heated to 150° C. for 1 hour, and to 180° C. for 1 hour. The reactor temperature was increased to 240° C. The monomers were polymerized for 8 hours at atmospheric pressure then the temperature was decreased to 180° C. Caprolactone was charged and reacted at 180° C. for 6 hours at atmospheric pressure, then vacuum was applied at 180° C. for 1 hour.

Polyamide 5

Hydrogenated dimer acid and piperazine were charged. The reactor was then heated to 150° C. for 1 hour, and to 180° C. for 1 hour. The reactor temperature was increased to 240° C. The monomers were polymerized for 8 hours at atmospheric pressure then the temperature was decreased to 180° C. Caprolactone was charged and reacted at 180° C. for 6 hours at atmospheric pressure, then vacuum was applied at 180° C. for 1 hour.

Polyamide 6

Hydrogenated dimer acid and piperazine were charged to the reactor under $N_2$ atmosphere. The reactor was then heated to 200° C. and the polymer formed for 4 hours. The reactor was cooled to 150° C. and 3-amino-1-propanol was added to the reactor. The polymer continued to form for 12 hours. The reactor was heated to 200° C. and vacuum was applied for 30 minutes. The product was a slightly yellowish paste at room temperature with an acid number <3.0 mg KOH/g polymer. The end-groups were hydroxyls.

Polyamide 7

Hydrogenated dimer acid and piperazine were charged. The reactor was then heated to 160° C. for 1 h, and to 180° C. for 1 h. The reactor temperature was increased to 240° C. The monomers were polymerized for 8 h hours at atmospheric pressure then the temperature was decreased to 180° C. Caprolactone was charged and reacted at 170° C. for 10 h at atmospheric pressure, then vacuum was applied at 200° C. for 1 h.

TABLE 1

Polyamide Compositions

| Component | Polyamide 1 | Polyamide 2 | Polyamide 3 |
|---|---|---|---|
| Sebasic acid | — | — | 144.9 g |
| Dimer acid | 760 g | 775.7 g | 726.1 |
| Piperazine | 163 | 160.3 | 132.4 |
| Caprolactone monomer | 127 | 114.1 | — |
| 2-(methylamino)ethanol | — | — | 68.3 |

| Component | Polyamide 4 | Polyamide 5 | Polyamide 6 | Polyamide 7 |
|---|---|---|---|---|
| Dimer acid | 782.5 g | 782.5 g | 1152.3 g | 698.4 |
| Piperazine | 159.3 | 159.3 | 129.3 | 171.8 |
| Caprolactone monomer | 108.7 | 108.7 | 91.1 | 275.5 |

Polyamide dispersions were then formed from the polyamides above in combination with polyisocyanates and dispersing monomers.

PD-A

Dimethylolbutanoic acid and the polyol (Polyamide 1) were charged to the prepolymer reactor and the dimethylolbutanoic acid was dissolved in the polymer melt at 90° C. Then methacrylates (methyl methacrylate and hexanediol dimethacrylate) were charged to the reactor and followed by the Des W and dibutyltin dilaurate. The reactor temperature was set to 90° C. and kept at that temperature for 30 minutes. The Ketone diol was dissolved in methyl methacrylate (59% diol) then added to the reactor. The reactor temperature was maintained at 90° C. until the theoretical NCO % reached. Then the temperature was changed to 70° C. and triethylamine was added, then cooled further to 55° C. and the prepolymer was dispersed into water. The dispersion was chain extended with the chain extender in 15 minutes. Then the methacrylates were polymerized at 50° C. for 1.5 hours in the presence of Fe(EDTA), t-butyl hydroperoxide and erythorbic acid. Finally, adipic dihydrazide was added. The product was a white waterborne acrylic polyurethane dispersion.

PD-B

Dimethylolbutanoic acid and the polyol (Polyamide 2) were charged to the prepolymer reactor and the dimethylolbutanoic acid was dissolved in the polymer melt at 90° C. Then Des W and dibutyltin dilaurate were charged to the reactor. The reactor temperature was set to 90° C. and kept at that temperature for 30 min. The Ketone diol was added to the reactor. Di(propylene glycol) dimethyl ether was added to the reactor to adjust viscosity. The reactor temperature was maintained at 90° C. until the theoretical NCO % was reached. The hexanediol dimethacrylate and methyl methacrylate were added to the reactor. Then the temperature was changed to 70° C. and triethylamine was added, then cooled further to 55° C. and the prepolymer was dispersed into water. The dispersion was chain extended with the hydrazine in 15 minutes. Then the methacrylates were polymerized at 50° C. for 1.5 hours in the presence of Fe(EDTA), t-butyl hydroperoxide and erythorbic acid. Finally, adipic dihydrazide was added. The product was a white waterborne acrylic polyurethane dispersion.

PD-C

Dimethylolbutanoic acid and a polyamide (Polyamide 3) were weighed into a reactor, the reactor was heated to 90° C. and stirred until the dimethylolbutanoic acid completely dissolved. Dimethylcarbonate was added during stirring and the reactor was cooled to 60° C. Des W was added during stirring and cooling. Dibutyltin dilaurate was added to the reactor and the reactor was maintained at 90° C. for 1 hour or until the target NCO % was reached. The reactor was then cooled to 70° C. and triethylamine was added. The reactor was further cooled to 55° C., isopropanol was added to the reactor, and the prepared prepolymer was dispersed into room temperature (RT) water. Hydroxyethyl ethylenediamine was added to the dispersion and the dispersion was heated to 35° C. for 20 min. The dispersion was then chain extended with hydrazine (35% solution in water) over 15 minutes. Solvents and water were evaporated at reduced pressure at 50-55° C. until desired solid content was reached. The final dispersion was a white waterborne polyurea/urethane dispersion.

PD-D

Dimethylolbutanoic acid and a polyamide (Polyamide 4) were weighed into a reactor, the reactor was heated to 90° C. and stirred until the dimethylolbutanoic acid completely dissolved. Dimethylcarbonate was added during stirring and the reactor was cooled to 60° C. Des W was added during stirring and cooling. Dibutyltin dilaurate was added to the reactor and the reactor was maintained at 90° C. for 1 hr or until the target NCO % was reached. The reactor was then cooled to 70° C. and triethylamine was added. The reactor was further cooled to 55° C., isopropanol was added to the reactor, and the prepared prepolymer was dispersed into RT water. Hydroxyethyl ethylenediamine was added to the dispersion and the dispersion was heated to 35° C. for 20 min. The dispersion was then chain extended with hydrazine (35% solution in water) over 15 minutes. Solvents and water were evaporated at reduced pressure at 50-55° C. until desired solid content was reached. The final dispersion was a white waterborne polyurea/urethane dispersion.

PD-E

Dimethylolbutanoic acid and a polyamide (Polyamide 5) were weighed into a reactor, the reactor was heated to 90° C. and stirred until the dimethylolbutanoic acid completely dissolved. Dimethylcarbonate was added during stirring and the reactor was cooled to 60° C. Des W was added during stirring and cooling. Dibutyltin dilaurate was added to the reactor and the reactor was maintained at 90° C. for 1 hour or until the target NCO % was reached. The reactor was then cooled to 70° C. and triethylamine was added. The reactor was further cooled to 55° C., isopropanol was added to the reactor, and the prepared prepolymer was dispersed into RT water. Hydroxyethyl ethylenediamine was added to the dispersion and the dispersion was heated to 3° C. for 20 minutes. The dispersion was then chain extended with hydrazine (35% solution in water) over 15 minutes. Solvents and water were evaporated at reduced pressure at 50-55° C. until desired solid content was reached. The final dispersion was a white waterborne polyurea/urethane dispersion.

PD-F

Dimethylolbutanoic acid and a polyamide (Polyamide 6) were weighed into a reactor, the reactor was heated to 90° C. and stirred until the dimethylolbutanoic acid completely dissolved. Di(propylene glycol) dimethyl ether was added during stirring and the reactor was cooled to 70° C. Des W was added during stirring and cooling. Dibutyltin dilaurate was added to the reactor and the reactor was maintained at 90° C. for 0.5 hours or until the target NCO % was reached. Dimethylcarbonate was added to the reactor to adjust viscosity. The reactor was then cooled to 70° C., triethylamine and Di(propylene glycol) butyl ether were added. The reactor was further cooled to 55° C., isopropanol was added to the reactor, and the prepared prepolymer was dispersed into RT water. Hydroxyethyl ethylenediamine was added to the dispersion and the dispersion was heated to 35° C. for 20 minutes. The dispersion was then chain extended with hydrazine (35% solution in water) over 15 minutes. The final dispersion was a white waterborne polyurea/urethane dispersion.

PD-G

Dimethylolbutanoic acid and a polyamide (Polyamide 2) were weighed into a reactor, the reactor was heated to 90° C. and stirred until the dimethylolbutanoic acid completely dissolved. Di(propylene glycol) dimethyl ether and dimethylcarbonate were added during stirring and the reactor was cooled to 70° C. Des W was added during stirring and cooling. Dibutyltin dilaurate was added to the reactor and the reactor was maintained at 90° C. for 30 minutes or until the target NCO % was reached. The reactor was then cooled to 70° C. and triethylamine was added. The reactor was further cooled to 55° C. and the prepared prepolymer was dispersed into RT water. Hydroxyethyl ethylenediamine was added to the dispersion and the dispersion was heated to 35° C. for 20 minutes. The dispersion was then chain extended with hydrazine (35% solution in water) over 15 minutes. The final dispersion was a white waterborne polyurea/urethane dispersion.

PD-H

Dimethylolbutanoic acid and a polyamide (Polyamide 2) were weighed into a reactor, the reactor was heated to 90° C. and stirred until the dimethylolbutanoic acid completely dissolved. Di(propylene glycol) dimethyl ether and dimethylcarbonate were added during stirring and the reactor was cooled to 70° C. Des W was added during stirring and cooling. Dibutyltin dilaurate was added to the reactor and the reactor was maintained at 90° C. for 30 minutes or until the target NCO % was reached. The reactor was then cooled to 70° C. and triethylamine was added. The reactor was further cooled to 55° C. and the prepared prepolymer was dispersed into RT water. Hydroxyethyl ethylenediamine was added to the dispersion and the dispersion was heated to 35° C. for 20 minutes. The dispersion was then chain extended with hydrazine (35% solution in water) over 15 minutes. The final dispersion was a white waterborne polyurea/urethane dispersion.

PD-I

Dimethylolbutanoic acid, methyl methacrylate, and the polyol (Polyamide 7) were charged to the prepolymer reactor and the dimethylolbutanoic acid was dissolved in the polymer melt at 90° C. Then the reactor was cooled to 50° C. and Des W was charged followed by dibutyltin dilaurate. The reactor temperature was maintained at 90° C. until the theoretical NCO % was reached. The temperature was changed to 70° C., triethylamine was added, then cooled further to 55° C., hexanediol dimethacrylate was added to the reactor and the prepolymer was dispersed into water. The dispersion was chain extended with hydrazine (35% solution in water) in 15 minutes. Then the methacrylates were polymerized at 50° C. for 1.5 h in the presence of Fe(EDTA), t-butyl hydroperoxide and erythorbic acid. The product was a white waterborne acrylic polyurethane dispersion.

TABLE 2

| Polyamide # | PD-A | PD-B | PD-C | PD-D | PD-E | PD-F | PD-G | PD-H | PD I |
|---|---|---|---|---|---|---|---|---|---|
| Polyamide 1 | 120.9 | | | | | | | | |
| Polyamide 2 | | 123.9 | | | | | 282.9 | 294.9 | |
| Polyamide 3 | | | 133.7 | | | | | | |
| Polyamide 4 | | | | 141.8 | | | | | |
| Polyamide 5 | | | | | 141.7 | | | | |
| Polyamide 6 | | | | | | 283.2 | | | |
| Polyamide 7 | | | | | | | | | 169.9 |
| Dimethylol-butanoic acid | 13.24 | 11.66 | 9.51 | 9.51 | 9.51 | 18.99 | 18.98 | 14.76 | 12.19 |
| Desmodur W | 98.45 | 93.41 | 52.14 | 45.89 | 45.90 | 92.53 | 90.54 | 83.11 | 100.8 |
| Di(propylene glycol) dimethyl ether | — | 17.2 | — | — | — | 19.9 | 39.9 | 39.9 | |
| Di(propylene glycol)dibutyl ether | | | | | | 20.0 | | | |
| Dimethyl carbonate DMC | | | 79.8 | 79.9 | 79.8 | 119.9 | 39.9 | | |
| Isopropanol | | | 20.0 | 20.0 | 20.0 | | | | |
| Dibutyltin dilaurate (catalyst) | 0.117 | 0.017 | 0.012 | 0.012 | 0.012 | 0.024 | 0.24 | 0.24 | 0.017 |
| Triethyl-amine | 10.84 | 9.54 | 7.13 | 7.14 | 7.13 | 14.26 | 14.24 | 11.08 | 9.98 |
| Methyl methacrylate | 62.53 | 61.96 | — | — | — | — | — | — | 64.8 |
| Hexanediol di-methacrylate | 6.95 | 6.88 | — | — | — | — | — | — | 7.2 |
| Ketone diol | 40.30 | 41.30 | — | — | — | — | — | — | — |
| Adipic acid dihydrazide | 7.45 | 7.63 | — | — | — | — | — | — | — |
| Water | 625 | 603.0 | 688.3 | 686.8 | 686.6 | 416.7 | 495.1 | 498.3 | 647.6 |
| Hydrazine (35 wt % active) | 14.40 | 14.50 | 5.09 | 5.10 | 5.07 | 7.95 | 10.21 | 9.95 | 16.6 |
| Hydroxyethyl ethylenediamine | — | — | 4.16 | 4.16 | 4.14 | 6.49 | 8.34 | 8.13 | — |
| t-butyl hydroperoxide 4% in $H_2O$ | 3.47 | 3.44 | — | — | — | — | — | — | 3.52 |
| Erythrorbic acid (2% in water) | 3.47 | 3.44 | — | — | — | — | — | — | 3.52 |
| Fe(EDTA) mL | 0.1 | 0.1 | — | — | — | — | — | — | 0.1 |

Ketone Diol Synthesis: A ketone functional diol can be prepared by combining items 1-3 of the ingredients below in a 4 neck flask equipped with a thermometer, overhead stirrer and nitrogen gas inlet. With stirring and under a nitrogen blanket, the temperature of the reaction mixture can be raised to 100° C. to 103° C. and held at this temperature for 1 hour. The temperature can then be raised to 110-114° C. and held there for an additional hour. Finally the reaction mixture temperature can be raised to 121-125° C. and held at this temperature for two hours or until the acid number is <1.0 (mg/g). The final material generally has slight amber color and a viscosity of 2200 cps at 70° C.

| 1 | Bisphenol A diglycidyl ether (Epon 828) | 331.4 g |
| 2 | Levulinic Acid | 202.1 |
| 3 | Triphenyl phosphine (TPP) | 4.0 |

In these examples, the following reagents were used: An aqueous coating was made starting with inventive dispersion PD-A and PD-B. Water and BYK™ 349(surfactant) were added to the dispersion, and then a mixture of Dipropylene glycol N-butyl Ether (DPnB cosolvent) and water was added under agitation and then Tego™ Airex 902W (defoamer) was added to the entire mixture under moderate agitation. This coatings was then left to mix for at least 15 min and labelled Coating I and Coating II respectively. A similar formulation was made using a premium waterborne polyurethane dispersion which contains NMP. The starting polymer has about 37 wt. % solids, a minimum film formation temperature of less than 5° C., a Brookfield viscosity, 25° C. of 500 cps max (using a #3 spindle), a tensile strength of 4800 psi, 100% modulus of 3300 psi, and an elongation to break in excess of 180%. This coating formulation from a premium urethane dispersion was labelled Coating III. If the polyamide polymers could perform as well as or better than the commercial polyurethane then they would be commercially competitive. All formulas were made to have roughly 30% total solids by weight and are less than 275 grams per liter of volatile organic compounds according to the EPA method 24.

Initial physical properties of Coating I and Coating II, like viscosity and pH, were measured at 25° C. The formulations were then incubated for 1 week at 52° C. at which time the properties were measured again. This is to give an indication of whether the formulas would hold up to being on a store shelf for extended periods of time. The results of these evaluations are in table 3 below.

TABLE 3

Viscosity of Formulated Coatings with Aging

| Formulation or Polymer Number | Initial Viscosity | Oven aged at 52° C. | | | |
|---|---|---|---|---|---|
| | | 1 week | 2 weeks | 3 weeks | 4 weeks |
| Coating I | 69.4 | 51.9 | 42.7 | 37.3 | 49.1 |
| Coating II | 31.4 | 35.6 | 31.9 | 30.6 | 24.3 |
| PD-A | 8.5 | 8.4 | 8.2 | 8.2 | 8.1 |
| PD-B | 8.3 | 8.2 | 8.1 | 8 | 7.9 |

The appearance of a wood coating is extremely important to the industry. A coating must form a continuous good film at low temperatures, and the coating must be capable of producing high gloss finishes (>80 Gloss Units). To test for this, each coating was drawn down on 2 Leneta Form 1B cards, using a 3 mil bird bar to achieve approximately 1 mil dry film thickness. One coated card was immediately placed in an environmental chamber at 4.4° C. and 50% relative humidity. The other was allowed to dry at room temperature. Gloss was measured on the chart paper that was left to cure at room temperature after 24 hours. The results of these are in the Table 4.

Hardness is another important property of wood coatings. It is important for the coating to be hard to protect the wood from indentations and abrasion. Hardness is tested using ISO 1522 Pendulum damping. The higher the number, the harder your coating is. 3 mil draw downs are made of each coating on 2 aluminum Q-panels and allowed to set at room temperature. 3 measurements are taken on each panel at 1, 7 and 14 days. The average results can be seen in Table 3. Black heel mark resistance is important for wood coatings that will be used on floors to resist black heels from marking on sports floors. The coefficient of friction is also an important aspect for floor coatings so that they are not too slippery or too sticky. The results of these tests are also shown in Table 5.

TABLE 5

Hardness Values, Black Heel Mark Resistance, and Average COF.

| Formulation number | Polymer | 1 day hardness | 7 days hardness | 14 days hardness | Black Heel Mark | Average COF |
|---|---|---|---|---|---|---|
| 63A Coating III | Premium urethane dispersion (control) | 42 | 64 | 67 | 7 | 0.60 |
| Coating I | PD-A | 58 | 89 | 88 | 8 | 0.60 |
| Coating II | PD-B | 61 | 92 | 98 | 7 | 0.60 |

Maple wood panels were prepared by applying each coating formulation to separate sections of said panel using a foam brush. Three coats were applied and the panels were allowed to air dry for at least 2 hours between coats. The first and second coats were lightly sanded to provide a smooth surface for the next layer, since grain-raising can occur when applying waterbased coating to wood.

Chemical resistance is important for any wood coating to protect the wood from discoloring and to avoid damaging the protective coating. Small spots of the chemicals are placed on the coated boards for different amounts of time (as indicated in Tables 6a and 6b). The chemicals are then removed the coating has one hour to recover before it is rated for both appearance and film integrity. Thirteen chemi

TABLE 4

Film Formation and Gloss of Coatings

| Formulation number | Polymer | 4.4° C. Unsealed Portion of Chart Paper - Pass/Fail | 4.4° C. Unsealed Portion of Chart Paper - Rating | 4.4° C. Sealed Portion of Chart Paper- Pass/Fail | 4.4° C. Sealed Portion of Chart Paper - Rating | RT Sealed Black Chart Paper - Pass/Fail | RT Sealed Black Chart Paper - Rating | Average 60° Gloss |
|---|---|---|---|---|---|---|---|---|
| Coating III | Premium urethane dispersion (control) | Pass | 4 | Pass | 5 | Pass | 5 | 94.4 |
| Coating I | PD-A | Pass | 5 | Pass | 5 | Pass | 5 | 82.6 |
| Coating II | PD-B | Pass | 5 | Pass | 5 | Pass | 5 | 96.1 | cals and household items that are known to damage wood surfaces have been tested with the results in Tables 6a and 6b.

TABLE 6a

Coating Resistance to Household Chemicals - Part I

| | | Heinz Vinegar 20 hours | | Heinz Ketchup 20 hours | | Coffee 20 hours | | 50% Ethanol 20 hours | | Ammonia 28% strength 1 hours | | French's Mustard 1 hour | | IPA 1 hour | |
|---|---|---|---|---|---|---|---|---|---|---|---|---|---|---|---|
| | | Appearance | Film | Appearance | Film | Appearance | Film | Appearance | Film | Appearance | Film | Appearance | Film | Appearance | Film Integrity |
| Coating III | Premium urethane dispersion (control) | 10 | 10 | 10 | 10 | 7 | 10 | 10 | 9 | 5 | 9 | 7 | 10 | 10 | 10 |
| Coating I | PD-A | 10 | 10 | 10 | 10 | 9 | 10 | 9 | 8 | 10 | 10 | 9 | 10 | 9 | 8 |
| Coating II | PD-B | 10 | 10 | 10 | 10 | 9 | 10 | 2 | 6 | 9 | 9 | 8 | 10 | 9 | 8 |

TABLE 6b

Coating Resistance to Household Chemicals -Part II

| | | Windex 1 hour | | 409 cleaner 1 hour | | Coppertone sunscreen 1 hour | | Deet 1 hour | | Sutter Home Red Wine 1 hour | | DI Water 4 hours | |
|---|---|---|---|---|---|---|---|---|---|---|---|---|---|
| | | Appearance | Film Integrity | Appearance | Film Integrity | Appearance | Film Integrity | Appearance | Film Integrity | Appearance | Film Integrity | Appearance | Film Integrity |
| Coating III | Premium urethane dispersion (control) | 5 | 9 | 4 | 9 | 8 | 10 | 10 | 10 | 8 | 9 | 5 | 8 |
| Coating I | PD-A | 10 | 10 | 10 | 10 | 10 | 10 | 9 | 8 | 10 | 10 | 10 | 10 |
| Coating II | PD-B | 10 | 10 | 10 | 10 | 10 | 10 | 9 | 8 | 10 | 10 | 10 | 10 |

A mixture of was prepared with Dipropylene glycol n-butyl ether (DPnB) and Dipropylene glycol methyl ether acetate (DPMA), then it was added to several inventive polyurethane dispersions including PD-C, PD-D, PD-E, PD-F, PD-G, and PD-H. Then a solution of Bayhydur 305 in Dipropylene Glycol Dimethyl Ether (DMM) was added to each dispersion system with agitation. BYK 349 was also added to each dispersion. All formulas were made to have roughly 35% total solids by weight and are about 250 grams per liter of volatile organic compounds according to the EPA method 24. The individual sample was drawn down on epoxy primed cold roll steel substrates. The dry film thickness is 2-2.5 mil on top of epoxy primer. The panels with coatings were dried at room temperature for another 7 days or baked at 65° C. for 20-30 minutes, after initial drying in the air for a half day.

The coating adhesion to substrate, corrosion resistance (rust, scribe creep), hardness and chemical resistance are the common key performance required for metal protection applications. The coated panels were tested by crosshatch cut and tape (ASTM D3359) for adhesion evaluation. 5B is 0 removal by tape after cut, 4B is 1-5% removal by tape, and 3B is 6-15% removal by tape. The coating adhesion was also tested after the panels were immersed in deionized water for 3-9 days (wet adhesion). Coated panels were also put into salt spray chamber (ASTM B117-09) to test the corrosion resistance. The rust is evaluated according to ASTM D610. The scribe creep in coatings were measured through salt spray according to ASTM D1654. The panels with same coatings were also put to Humidity chamber (ASTM D2247), and the rust of each coating system is evaluated accordingly. The standard pencils were used to test the pencil hardness of coatings on panels according to ASTM D3363. The chemical resistance tests were conducted by contacting coatings with chemicals including gasoline, diesel, brake fluid, hydraulic fluid, methyl ethyl ketone (MEK) and sun screen cream. ASTM D2247 is used as the reference for this test.

The testing results are listed in the table below.

TABLE 7

Coating Results in Salt Spray Test

| Polymer | Dry Adhesion | Wet Adhesion Best through | Salt spray field rust Best through | Salt spray scripe creep Best through | Pencil Hardness Scratch/ Gouge | Chemical Resistance, stain/damage Best = 60/60 | Humidity Best through |
|---|---|---|---|---|---|---|---|
| PD-C | 58 | 3 day 4B | 1015 h. no rust | 1015 2.0 mm | 1B/3H | 52/45 | N/A |
| PD-D | 58 | 3 day 4B | 1005 h. no rust | 1005 1.1 mm | HB/2B | 58/45 | 1005 h no rust |

TABLE 7-continued

Coating Results in Salt Spray Test

| Polymer | Dry Adhesion | Wet Adhesion Best through | Salt spray field rust Best through | Salt spray scripe creep Best through | Pencil Hardness Scratch/ Gouge | Chemical Resistance, stain/damage Best = 60/60 | Humidity Best through |
|---|---|---|---|---|---|---|---|
| PD-E | 58 | 4 day5B | 1000 h. no rust | 1005 1.1 mm | 1H/3H | 53/51 | 1005 h no rust |
| PD-F | 58 | 9 day4B | 1000 h. no rust | 1000 2.0 mm | 1H/3H | 52/49 | 716 h no rust |
| PD-G | 58 | 9 day5B | 1000 h. no rust | 1000 1.6 mm | 1B/3H | 50/46 | 716 h no rust |
| PD-H | 58 | 4 day3B | 1000 h. 0.1 rust | 1000 m 1.6 mm | 3B/1H | 52/51 | 716 h no rust |

Wet Hot Tire Pick-Up Resistance

Two coats of resin shown in Table 8 were applied on Type 1 smooth concrete, with 2 hour dry time between coats. The concrete panels were dried at room temperature for 3 days. Tire pieces were placed in 140° F. (60° C.) water bath for 1.5 hours to similate hot tire pieces. A damp cheese cloth was placed on the surface of coated concrete panel for 1 hour to moisten the concrete. The cheese cloth was removed from the surface of concrete panel. The panel was placed facing up on Pico press platform. Hot tire pieces were removed from the bath and placed on top of coated concrete. Using the Pico Press, 40 psi (0.2758n MPa) of pressure (based on the surface area of the tire pieces) is applied to the concrete panels for 24 hours at 25° C. After removing the concrete panels from the press, the samples are rated for imprint, adhesion, and gloss change.

Formulation for Hot Tire Pick-Up Resistance

The formulation for the NC resins used DPnB glycol ether coalescing aid at VOC of 200 g/L. The volume solids percent of the dispersion was adjusted to 30v %. Aziridine PZ33 and Bayhydur 305 (polyisocyanate) were selected for the crosslinkers and Coatosil MP-200 was selected for the hardener. The crosslinker was post-added on dry weight basis at 3.5 wt %. The hardener was post-added on wet weight basis at 0.5 wt %. The control was a self-crosslinking polyacrylate coating for concrete formulation with and without the hardener at 0.5 wt % post-add.

The Table 8 below demonstrates the adhesion and resistance to wear from automobile tires.

TABLE 8

Coating Results in Hot Tire Pick-Up Test

| Polymer | Crosslinker | Silane | Hot Tire Pick-up |
|---|---|---|---|
| PD-I | none | none | Pass |
| Novel copolymer PD-I | none | MP200 (0.5%) | Pass |
| PD-I | AZ (3.5%) | none | Pass |
| PD-I | AZ (3.5%) | MP200 (0.5%) | Pass |
| PD-I | Bay305 (3.5%) | none | Pass |
| PD-I | Bay305 (3.5%) | MP200 (0.5%) | Pass |
| Self-crosslinking Acrylic polymer | none | none | Fail |
| Self-crosslinking Acrylic polymer | none | MP200 (0.5%) | Fail |

Each of the documents referred to above is incorporated herein by reference. Except in the Examples, or where otherwise indicated, all numerical quantities in this description specifying amounts, reaction conditions, molecular weights, number of carbon atoms, etc., are to be understood as modified by the word "about." Unless otherwise indicated, all percent and formulation values are on a molar basis. Unless otherwise indicated, all molecular weights are number average molecular weights. Unless otherwise indicated, each chemical or composition referred to herein should be interpreted as being a commercial grade material which may contain the isomers, by-products, derivatives, and other such materials which are normally understood to be present in the commercial grade. It is to be understood that the upper and lower amount, range, and ratio limits set forth herein may be independently combined. Similarly, the ranges and amounts for each element of the invention can be used together with ranges or amounts for any of the other elements. As used herein, the expression "consisting essentially of" permits the inclusion of substances that do not materially affect the basic and novel characteristics of the composition under consideration. All of the embodiments of the invention described herein are contemplated from and may be read from both an open-ended and inclusive view (i.e., using "comprising of" language) and a closed and exclusive view (i.e., using "consisting of" language). As used herein parentheses are used designate 1) that the something is optionally present such that monomer(s) means monomer or monomers or (meth)acrylate means methacrylate or acrylate, 2) to qualify or further define a previously mentioned term, or 3) to list narrower embodiments.

While certain representative embodiments and details have been shown for the purpose of illustrating the subject invention, it will be apparent to those skilled in this art that various changes and modifications can be made therein without departing from the scope of the subject invention.

What is claimed is:

1. A film on a substrate, said film comprising a binder, optionally a pigment, and optionally a filler, wherein at least 50 wt. % of the binder in the film is amide repeat units having an amide linkage at one or more ends of each amide repeat unit, said amide repeat units being derived from condensation polymerization or ring opening polymerization of monomers selected from the group consisting of dicarboxylic acid, lactam, aminocarboxylic acid, and diamine monomers, and each of said amide linkages being the reaction product of a carboxylic group reacting with an amino group, and wherein at least 5 wt. % of said binder is repeat units having urea or urethane linkages at two or more ends of each repeat unit derived from polyisocyanates, and wherein at least 70 mole % of said amide linkages are tertiary amide linkages each having a nitrogen chemically bonded to a carbonyl group and two hydrocarbon groups, wherein said film is formed from a dispersion of said binder before drying and said binder is colloidally stabilized in said dispersion via anionic, cationic, or nonionic stabilizing groups of said binder, or combinations thereof, and wherein said binder is crosslinked.

2. The film on a substrate according to claim 1, wherein the binder further comprises ether and/or ester linkages, in addition to said urea or urethane linkages.

3. The film on a substrate according to claim 1, wherein said film further comprises at least one pigment, at least one dye, or at least one filler.

4. The film on a substrate according to claim 1, wherein said film is characterized as having been applied by brushing, rolling, dipping, wiping, spraying, powder coating, curtain coating, or t-bar coating.

5. The film on a substrate according to claim 1, wherein at least 50 mole % of the amide repeat units are aliphatic amide repeat units.

6. The film on a substrate according to claim 1, wherein said substrate is a metal substrate.

7. The film on a substrate according to claim 1, wherein the substrate is a metal selected from iron, steel, copper, aluminium, and alloys having at least 50 wt. % of iron or aluminium.

8. The film on a substrate according to claim 1, wherein said substrate is a masonry substrate and said masonry substrate is selected from concrete, mortar, brick, stone, or other inorganic structural material.

9. The film on a substrate according to claim 1, wherein said substrate is selected from wood or combinations of wood and plastic.

10. The film on a substrate according to claim 1, wherein said substrate is a plastic or a composite comprising plastic.

11. The film on a substrate according to claim 1, wherein said binder is crosslinked with a polyisocyanate, aziridine, carbodiimide, polyepoxide, or derivatives thereof.

12. The film on a substrate according to claim 1, wherein said binder is crosslinked via ketone-hydrazine crosslinking.

13. The film on a substrate according to claim 1, wherein said substrate and said film comprise a floor or deck surface.

14. The film on a substrate according to claim 1, wherein said substrate and said film comprise an exterior construction surface.

15. The film on a rigid substrate according to claim 1, wherein said substrate and said film comprise a transportation vehicle.

* * * * *